United States Patent [19]

Saito et al.

[11] Patent Number: 5,541,926
[45] Date of Patent: Jul. 30, 1996

[54] ATM CELL ASSEMBLY AND DISASSEMBLY DEVICE WITH ENHANCED DATA HANDLING FLEXIBILITY

[75] Inventors: Takeshi Saito; Akihiro Horiguchi; Muneyuki Suzuki, all of Tokyo; Keiji Tsunoda, Kanagawa-ken, all of Japan

[73] Assignee: Kabushiki Kaisha Toshiba, Kawasaki, Japan

[21] Appl. No.: 130,136

[22] Filed: Oct. 4, 1993

[30] Foreign Application Priority Data

Oct. 2, 1992 [JP] Japan ................................. 4-265140
Mar. 10, 1993 [JP] Japan ................................. 5-075087

[51] Int. Cl.$^6$ ................................................. H04L 12/56
[52] U.S. Cl. ................................................. 370/94.2; 370/99
[58] Field of Search ................................. 370/94.1, 94.2, 370/60.1, 99

[56] References Cited

U.S. PATENT DOCUMENTS

| | | | |
|---|---|---|---|
| 5,237,569 | 8/1993 | Sekihata et al. | 370/94.1 |
| 5,270,811 | 12/1993 | Ishibashi et al. | 370/94.1 |
| 5,311,513 | 5/1994 | Ahmadi et al. | 370/94.1 |
| 5,313,454 | 5/1994 | Bustini et al. | 370/94.1 |
| 5,327,421 | 7/1994 | Hiller et al. | 370/94.2 |
| 5,341,376 | 8/1994 | Yamashita | 370/94.2 |
| 5,375,121 | 12/1994 | Nishino et al. | 370/94.2 |
| 5,379,293 | 1/1995 | Kanno et al. | 370/94.2 |
| 5,392,280 | 2/1995 | Zheng | 370/94.2 |

FOREIGN PATENT DOCUMENTS 4-167732  6/1992  Japan.

*Primary Examiner*—Douglas W. Olms
*Assistant Examiner*—Min Jung
*Attorney, Agent, or Firm*—Foley & Lardner

[57] ABSTRACT

An ATM cell assembly and disassembly device capable of flexibly dealing with various data speeds on STM and ATM sides, and preventing the buffer overflow. In the ATM cell assembly device, the data stored in the buffer are outputted when an amount of the stored data becomes not less than a prescribed data amount sufficient for loading a payload section of each ATM cell, and the ATM cell flow is obtained from the ATM cells assembled from the data outputted from the buffer and empty cells. The buffer can be allowed to output the stored data only when the output permission signal issued in accordance with usage parameter control (UPC) parameters determined at a time of call set up is received. In the ATM cell disassembly device, the output data are stored into the buffer when a currently remaining capacity of the buffer becomes not less than an amount of data loaded in a payload section of each ATM cell, and the STM signals are obtained from the output data outputted from the buffer.

20 Claims, 19 Drawing Sheets

FIG. 24A
(1-BYTE AAL HEADER)
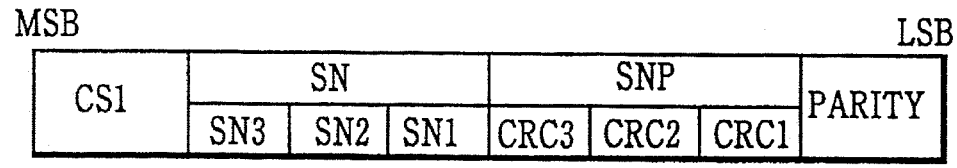
FIG. 24B
(2-BYTES AAL HEADER)
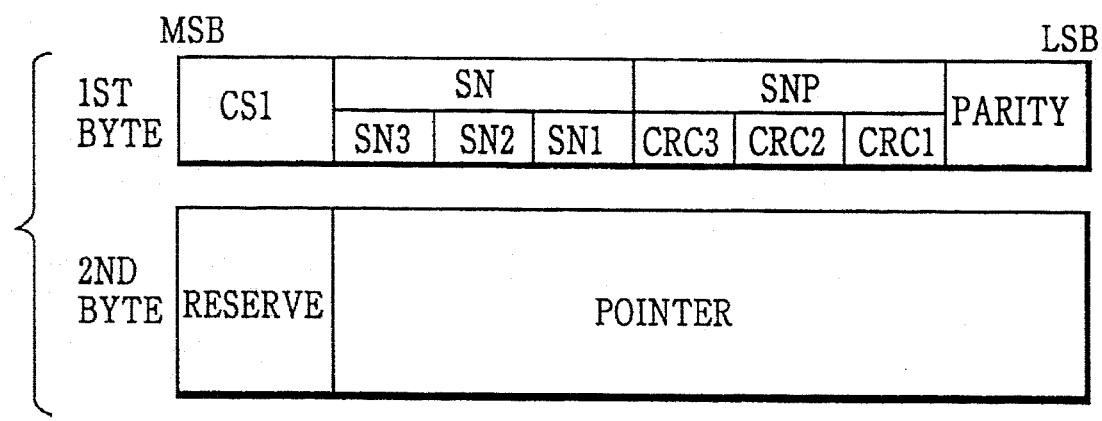
FIG. 25
| CONDITION | JUDGEMENT | PROCESSING |
|---|---|---|
| SN−TN>W | CELL MISINSERTION | DISCARDING OF CELL |
| SN=TN | NORMAL ARRIVAL | RE-ASSEMBLY PROCESSING |
| SN−TN<W | CELL LOSS | DUMMY INTERPOLATION PROCESSING | ns
ATM CELL ASSEMBLY AND DISASSEMBLY DEVICE WITH ENHANCED DATA HANDLING FLEXIBILITY

BACKGROUND OF THE INVENTION

1. Field of the Invention

The present invention relates to an ATM cell assembly and disassembly device for assembling and disassembling the ATM cells carrying the data used in the ATM communication system.

2. Description of the Background Art

In recent years, in order to deal with the demands for variety of communications such as image communication and high speed data communication, the construction of the B-ISDN (Broadband-Integrated Service Digital Network) is in progress as an integrated communication network for facilitating efficient and flexible communication services. In a realization of the B-ISDN, the ATM (Asynchronous Transfer Mode) data exchange scheme is expected to play a key role. The ATM data exchange scheme is a scheme in which the data are loaded into a packet of a fixed length called ATM cell regardless of their attributes, and the communication service is realized by using such an ATM cell as a unit of data exchange.

In a conventional communication system, the packet assembly scheme has been applicable only to a kind of communication data which requires no real-time processing such as those for the usual data communication, so that a new packet assembly scheme is needed for the communication of the real-time data such as speech data and image data.

As such an ATM cell assembly scheme for the real-time data, there are propositions of: (a) a scheme for assembling an ATM cell by accumulating the successively entered real-time input data in a buffer, and attaching an ATM header to the accumulated data when a total amount of input data accumulated in the buffer reaches a predetermined amount such as that corresponding to a length of a payload section in each ATM cell to be assembled or a partially filling number for a payload section in each ATM cell to be assembled; and (b) a scheme in which a ratio of a speed of the input data and a transmission speed on the ATM side is determined in advance, and a cycle for outputting the ATM cell assembled from the input data and a cycle for outputting other cells such as empty cells are sequentially controlled to satisfy the predetermined transmission speed on the ATM side.

However, in scheme (a), the ATM cell generation cycle is going to be synchronous with the cycle of input data, so that it becomes necessary to provide a speed matching buffer for matching the transmission speed of the generated ATM cells with that suitable for the ATM side interface on the downstream side of the ATM cell assembly device, but this requirement leads to a considerable increase of the amount of hardware required for the communication system.

On the other hand, in scheme (b), it is impossible to provide a flexibility in the set up of the speed of the input data, so that a type of the input data that can be handled in the communication system is going to be restricted in view of the speed of the input data.

Now, one of the characterizing feature of the ATM communication scheme is the improvement of the network utilization efficiency based on the statistical multiplexing effect due to the label multiplexing of the cells on the transmission path. To this end, the ATM communication scheme requires a resource management which is not required in the conventional communication scheme.

More specifically, in order to share the resource in the network by the label multiplexing, each terminal which initiates the communication by making a call set up request reports parameters such as the peak rate and the average rate of the requested call as the UPC (Usage Parameter Control) parameters to the network. Then, the network carries out the resource management by making the judgement as to whether it is possible to guarantee the quality of service required to the network when the requested call is admitted or not according to the predetermined evaluation function, and then admitting the requested call only when it is judged that the required quality of service can be guaranteed even when the requested call is admitted. The terminal for which the requested call has been admitted in this manner should output the cells for the communication by observing the UPC parameters reported at a time of the call set up request, in order to prevent the outputted cells from being discarded by the policing function adopted in the network side.

This observance of the UPC parameters on the terminal side is usually achieved by modifying the cell traffic to be transmitted into a modified traffic satisfying the UPC parameters, and then outputting this modified traffic to the transmission path. This operation on the terminal side is called traffic shaping.

This traffic shaping has conventionally been achieved by a configuration shown in FIG. 1 in which the ATM cell flow generated at the ATM encoding and cell generation unit 501 is stored in a shaping buffer 502 once, and the ATM cells are taken out from this shaping buffer 502 under the control of a shaping controller 503 in accordance with the UPC parameters determined at a time of the call set up, and outputted to the transmission path. As the algorithm to be used by the shaping controller 503 in realizing such a traffic shaping, the leaky bucket algorithm and the sliding window algorithm are conventionally known.

In this manner, in the conventional communication scheme, the communication is realized in a form observing the UPC parameters by applying the traffic shaping on the cell flow outputted from the terminal before transmitting to the transmission path. However, in this conventional communication scheme, there is a possibility for the cells to be discarded at the shaping buffer 502. Namely, in the case the ATM encoding and cell generation unit 501 continually carries out the ATM encoding at a rate close to the peak speed, because the shaping buffer 502 can output the cells only at a constant rate, the amount of cells entered from the ATM encoding and cell generation unit 501 to the shaping buffer 502 may exceed the amount of cells outputted from the shaping buffer 502 to the transmission path, such that the overflow of the entered cells may occur at the shaping buffer 502.

As a solution to this problem of the shaping buffer overflow, the increasing of the capacity of the shaping buffer itself gives rise to another concern regarding the increase of the amount of hardware.

Also, in the ATM communication scheme, the communication service is expected to be charged in proportion to the peak rate used in the communication, so that the user will normally desire to suppress the peak rate to be used in the communication as low as possible in order to minimize the communication cost. In order to realize such a communication with the suppressed peak rate, the call set up request to the network should be made with a low peak rate and a peak rate value in the traffic shaping operation should be set to be low during the communication. Here, it possible for the peak rate used in the ATM encoding and cell generation unit 501 to exceed the peak rate used in the shaping buffer 502, and in such a case, depending on the encoding speed at the ATM encoding and cell generation unit 501, the shaping buffer 502 needs to accumulate a large number of cells, so that the large capacity is required for the shaping buffer 502, but this requirement also leads to the concern regarding the increase of the amount of hardware.

On the other hand, in the ITU-T (International Telecommnications Union-Telecommnication sector; formerly CCITT (The Consultative Committee for International Telegraph and Telephone)), the following schemes for preventing the deterioration of the congestion of the network are considered.

(a) The network attaches a flag for notifying the occurrence of the congestion to the user cell at the congested point in the network, the receiver side user receiving this user cell with this flag attached requests the transmitter side user to suppress the amount of transmission in response to this flag, and the transmitter side user suppresses the amount of transmission in accordance with this request from the receiver side user. This scheme is called the congestion control using FECN (Forward Explicit Congestion Notification).

(b) The network transmits a congestion notification cell from the congested point in the network to the transmitter side user, to request the suppression of the amount of transmission, and the transmitter side user suppresses the amount of transmission in response to this congestion notification cell. This scheme is called the congestion control using BECN (Backward Explicit Congestion Notification).

(c) The receiver side user recognizes the occurrence of the congestion of the network by detecting the cell loss due to the congestion, and requests the transmitter side user to suppress the amount of transmission, and the transmitter side user suppresses the amount of transmission in accordance with this request.

In any of these schemes, the transmitter side user to which the suppression of the amount of transmission is requested is expected to suppress the amount of transmission by controlling the shaping controller 503 to lower the parameters such as the peak rate and the average rate of the transmission traffic. However, in this case, the encoding speed at the ATM encoding and cell generation unit 501 is also required to be lowered in conjunction with the change of the parameters at the shaping controller 503, because otherwise the cells entering from the ATM encoding and cell generation unit 501 can exceed the cells outputted from the shaping buffer 502 to cause the shaping buffer overflow. Yet, such a changing of the parameters on both of the shaping controller 503 and the ATM encoding and cell generation unit 501 is going to be complicated as well as relatively slow because it calls for the parameter changing operations to be made at more than one parts in the configuration of FIG. 1.

Now, on the other hand, the ATM cell disassembly device is a device for recovering the data from the ATM cell obtained by the ATM cell assembly device. In this ATM cell disassembly device, in order to deal with the cell loss in the ATM communication network and the jitter in the cell arrival intervals called CDV (Cell Delay Variation), it is indispensable to provide a mechanism for absorbing and compensating these loss and CDV.

As a conventional scheme for the ATM cell disassembly for the real-time data, there is a scheme using a configuration shown in FIG. 2 in which the ATM cells received at an ATM processing unit 901 are pooled in a large capacity jitter absorption buffer 902 once, and the pooled ATM cells are taken out from this jitter absorption buffer 902 to an STM (Synchronous Transfer Mode) processing unit 903 at regular intervals, so as to absorb the jitter in the cell arrival intervals. Here, in a case the cell loss or the erroneous cell transmission is involved, the interpolation using dummy cell or dummy cell data and the discarding of the erroneously transmitted cell are carried out at either input or output side of the jitter absorption buffer 902.

Then, either at the output side of the jitter absorption buffer 902 or at the jitter absorption buffer 902 itself, the transfer to the receiver side clock is made, the necessary data obtained by removing unnecessary sections such as the header from the ATM cell are transmitted to the receiver side.

Here, in a case the operation frequency of the receiver side is predetermined, the ATM cell disassembly can be achieved by setting the timing to take out the cell from the jitter absorption buffer 902 to be equal to this operation frequency of the receiver side. However, in this scheme, the speed of the data outputted from the ATM cell disassembly device is predetermined and it is impossible to flexibly realize the various different speeds for the output data, or to flexibly deal with a case in which the receiver side comprises STM time slots whose number can vary in time.

Thus, the conventional ATM cell disassembly scheme lacks the flexibility as it fixes the ratio of the data input and output speeds to a predetermined ratio.

SUMMARY OF THE INVENTION

It is therefore an object of the present invention to provide an ATM cell assembly device capable of flexibly obtaining the ATM cell flow with any desired cell cycles, without being restricted by the speed of the input data and requiring an additional hardware such as a speed matching buffer.

It is another object of the present invention to provide an ATM cell assembly device capable of preventing the buffer overflow while achieving the desired traffic shaping, without significantly increasing the amount of hardware.

It is another object of the present invention to provide an ATM cell disassembly device capable of flexibly dealing with various data speeds.

According to one aspect of the present invention there is provided an asynchronous transfer mode (ATM) cell assembly device for obtaining an ATM cell flow by assembling ATM cells from input data, comprising: buffer means for temporarily storing the input data, from which stored data are outputted when an amount of the stored data becomes not less than a prescribed data amount sufficient for loading a payload section of each ATM cell; and cell assembly means for assembling each ATM cell by loading the stored data outputted from the buffer means into the payload section and attaching a header section to the payload section, and outputting the ATM cell flow containing the assembled ATM cells when the stored data outputted from the buffer means are received and other cells otherwise.

According to another aspect of the present invention there is provided an asynchronous transfer mode (ATM) cell assembly device for obtaining an ATM cell flow by assembling ATM cells from input data, comprising: encoding means for obtaining the input data by encoding data to be transmitted as the ATM cells; buffer means for temporarily storing the input data obtained by the encoding means;

output permission means for issuing an output permission signal permitting an output of the input data stored in the buffer means in accordance with usage parameter control (UPC) parameters determined at a time of call set up, where the buffer means is allowed to output the input data stored therein only when the output permission signal is received from the output permission means; and cell assembly means for assembling each ATM cell by loading the stored input data outputted from the buffer means into a payload section and attaching a header section to the payload section, and outputting the ATM cell flow containing the assembled ATM cells.

According to another aspect of the present invention there is provided an asynchronous transfer mode (ATM) cell disassembly device for obtaining output signals from entered ATM cell flow by disassembling ATM cells, comprising: ATM processing means for extracting output data to be outputted as the output signals from the ATM cells; buffer means for temporarily storing the output data extracted by the ATM processing means, to which output data are stored from the ATM processing means when a capacity of the buffer means currently remaining becomes not less than an amount of data loaded in a payload section of each ATM cell; and output processing means for obtaining the output signals from the output data outputted from the buffer means, and outputting the obtained output signals.

Other features and advantages of the present invention will become apparent from the following description taken in conjunction with the accompanying drawings.

BRIEF DESCRIPTION OF THE DRAWINGS

FIGS. 24A and 24B are diagrammatic Illustrations of 1 byte and 2 bytes adaptation layer headers, respectively, used in the ATM cell disassembly device of FIG. 16.

FIG. 25 is a table summarizing the window control scheme to be utilized in a cell arrival order control in the ATM cell disassembly device of FIG. 16.

DETAILED DESCRIPTION OF THE PREFERRED EMBODIMENTS

Figure 1:
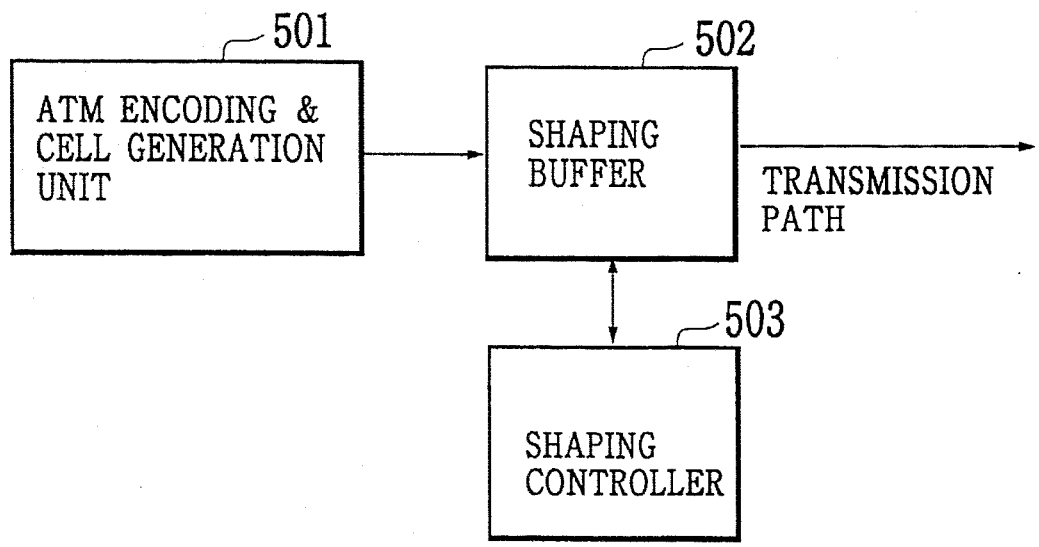
FIG. 1 is a schematic block diagram of an example of a conventional ATM cell assembly device.
Figure 2:
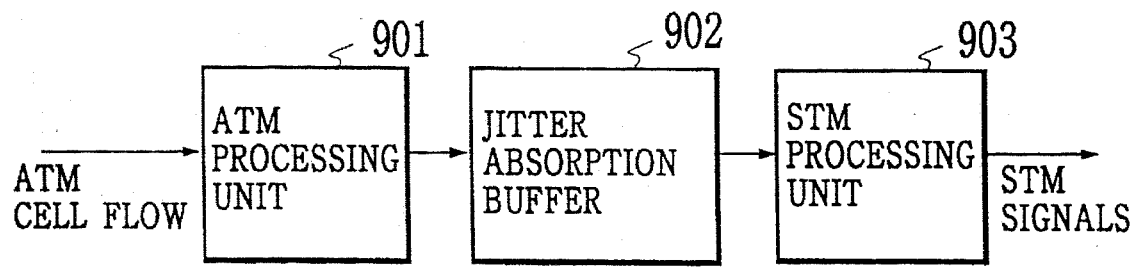
FIG. 2 is a schematic block diagram of an example of a conventional ATM cell disassembly device.
Figure 3:
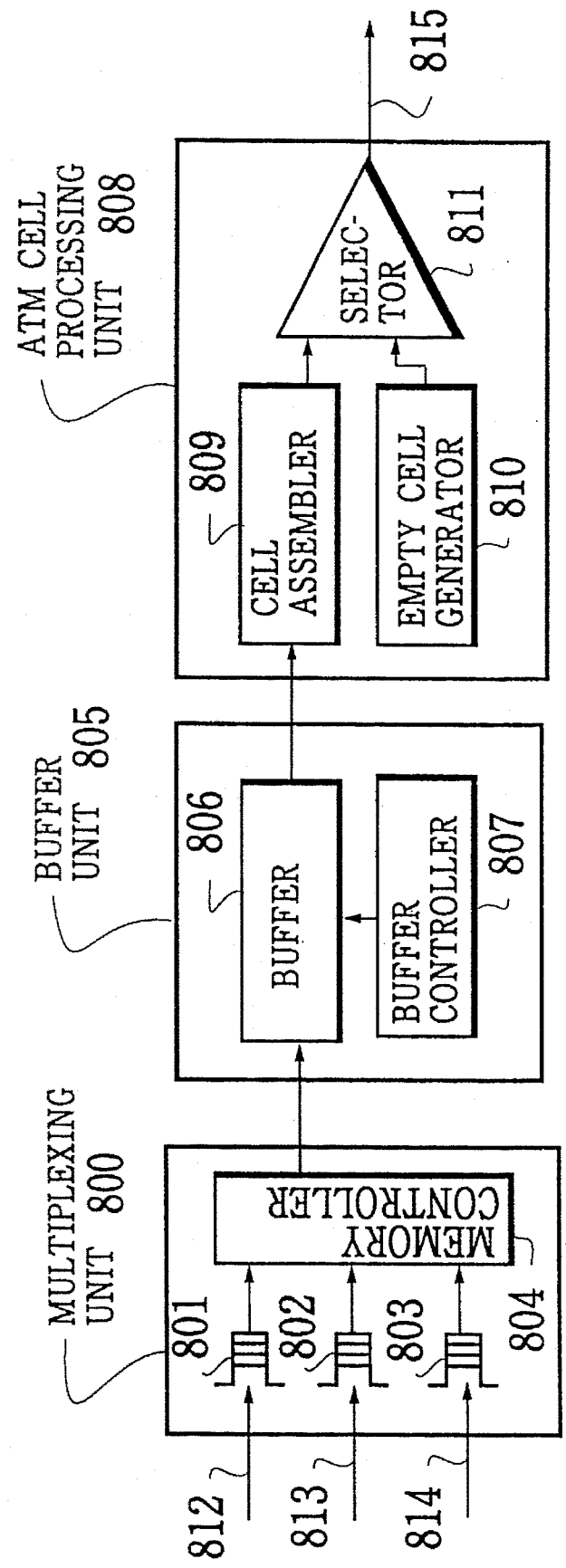
FIG. 3 is a schematic block diagram of a first embodiment of an ATM cell assembly device according to the present invention.

Referring now to FIG. 3, a first embodiment of an ATM cell assembly device according to the present invention will be described in detail.

This ATM cell assembly device of the first embodiment shown in FIG. 3 is capable of connecting a plurality of already existing communication devices such as telephones, TVs, computers, etc., to the ATM network, and generally comprises: a multiplexing unit 800 receiving input data from a plurality (three in FIG. 3) input lines 812, 813, and 814 connected with already existing communication devices (not shown); a buffer unit 805, connected with an output of the multiplexing unit 800, for temporarily storing the output of the multiplexing unit 800; and an ATM cell processing unit 808, connected with an output of the buffer unit 805, for obtaining the desired ATM cell flow to be outputted to a transmission path 815.

The multiplexing unit 800 includes memories 801, 802, and 803 for storing the input data received from the input lines 812, 818, and 814, respectively, and a memory controller 804 for selectively outputting the input data stored in the memories 801, 802, and 803.

The buffer unit 805 includes a buffer 806 for temporarily storing the selected input data outputted from the multiplexing unit 800 in correspondence to each of the input lines 812, 813, and 814, and a buffer controller 807 for controlling a data output timing of the buffer 806 such that the accumulated data are read out to the ATM cell processing unit 808 when the amount of input data accumulated for each of the input lines 812, 813, and 814 reaches to a predetermined level appropriate for a payload section of the ATM cell to be assembled.

The ATM cell processing unit 808 includes a cell assembler 809 for assembling an ATM cell by attaching a header section to the accumulated data outputted from the buffer 806 of the buffer unit 805, an empty cell generator 810 for generating empty cells, and a selector 811 for selectively outputting the ATM cell obtained by the cell assembler 809 and the empty cells generated by the empty cell generator 810 to the transmission path 815. Here, the selector 811 selectively outputs the ATM cell obtained by the cell assembler 809 whenever the ATM cell is assembled by the cell assembler 809, and the empty cells generated by the empty cell generator 810 otherwise.

In other words, in this ATM cell assembly device of FIG. 3, whenever the valid ATM cell is not available, the empty cells are filled in, so as to obtain the full ATM cell flow with desired cell cycles.

Thus, in this ATM cell assembly device of FIG. 3, the desired ATM cell flow with desired cell cycles can be obtained by assembling the ATM cell from the input data entered at an arbitrary speed, without being restricted by the speed of the input data and requiring an additional hardware such as a speed matching buffer.

In addition, normally, it can be expected that the operation speed on the ATM network side is faster than the operation speed on the already existing communication device side, so that it can be considered as highly unlikely for the buffer 806 to store more than a certain amount of input data and therefore its capacity can be relatively small, which also contributes to the reduction of the amount of hardware.

Figure 4:
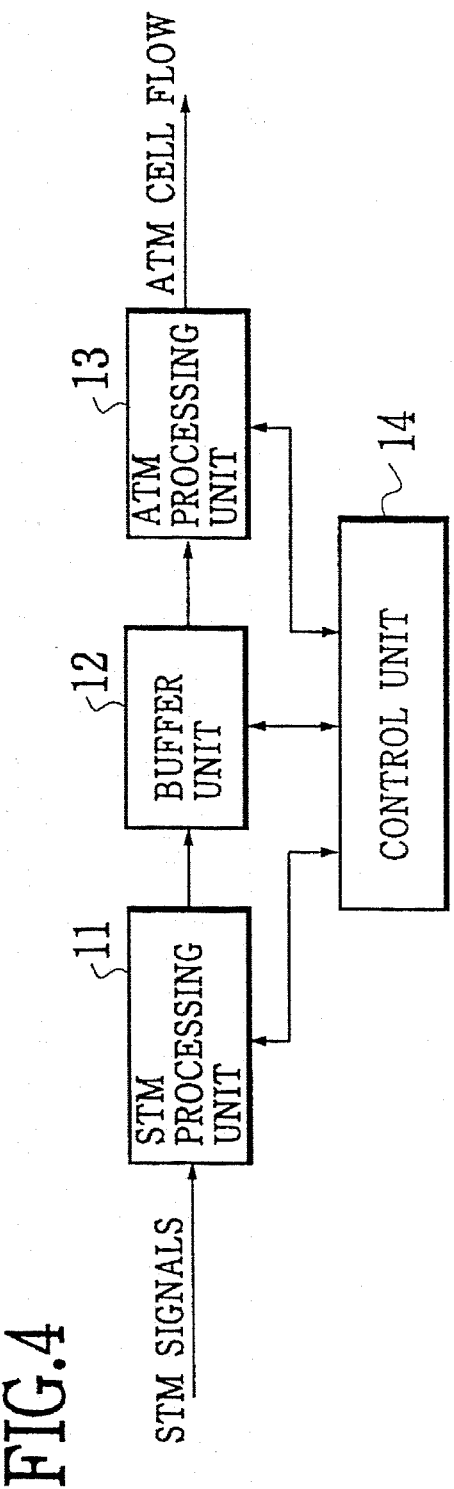
FIG. 4 is a schematic block diagram of a second embodiment of an ATM cell assembly device according to the present invention.

Referring now to FIG. 4, a second embodiment of an ATM cell assembly device according to the present invention will be described in detail.

This ATM cell assembly device of the second embodiment shown in FIG. 4 is for obtaining the ATM cell flow from the STM signals such as the telephone signals. In principle, the STM signals comprises a plurality of time slots to which each frame has been divided in time, and the ATM cell is assembled by selectively extracting several slots from the STM signals and loading them into a payload section of the ATM cell, and attaching the header section.

In this second embodiment, the ATM cell assembly device generally comprises: an STM processing unit 11 for receiving the externally supplied STM signals; a buffer unit 12 connected with the STM processing unit 11 for temporarily storing the output of the STM processing unit 12; an ATM processing unit 13 connected with the buffer unit 12 for obtaining the ATM cell flow from the output of the buffer unit 12; and a control unit 14 for controlling the operations of the STM processing unit 11, the buffer unit 12, and the ATM processing unit 18 in a manner described in detail below.

The STM processing unit 11 extracts the input data to be transmitted as the ATM cells from the entered STM signals, and outputs the extracted input data to the buffer unit 12, while also outputting the synchronization information regarding the STM frame synchronization, i.e., the information indicating a head of each STM frame, to the buffer unit 12.

The buffer unit 12 comprises a dual port RAM (2P-RAM), and functions as a FIFO (First-In First-Out) memory. In addition, this buffer unit 12 also has a function of speed conversion (clock conversion) between the speed on the STM side and the speed on the ATM side.

The ATM processing unit 13 assembles the ATM cell by loading the input data taken out from the buffer unit 12 into the payload section of the ATM cell and attaching the header section, and outputs the obtained ATM cells to the ATM network side. In addition, this ATM processing unit 18 also has a function of outputting the empty cells to the ATM network side whenever the valid ATM cell to be outputted is absent.

Figure 5:
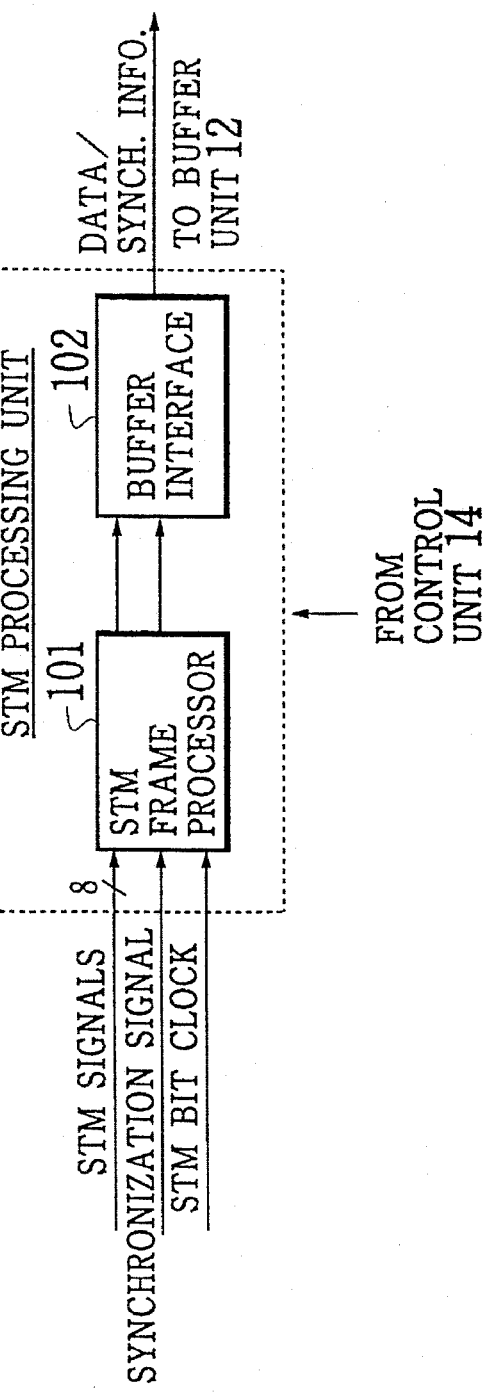
FIG. 5 is a block diagram of an STM processing unit in the ATM cell assembly device of FIG. 4.

In further detail, the STM processing unit 11 has a detailed configuration as shown in FIG. 5, which comprises an STM frame processor 101 receiving the STM signals along with the synchronization signal and the STM bit clock, and a buffer interface 102 for outputting the data and the synchronization information to the buffer unit 12. Here, the STM signals externally supplied to this STM processing unit 11 can be the 8 bit parallel data for example, and each frame of the STM signals may be divided into 32 STM time slots for example. The STM signals can also be the CBR (Continuous Bit Rate) signals having arbitrary speed.

Figure 6:
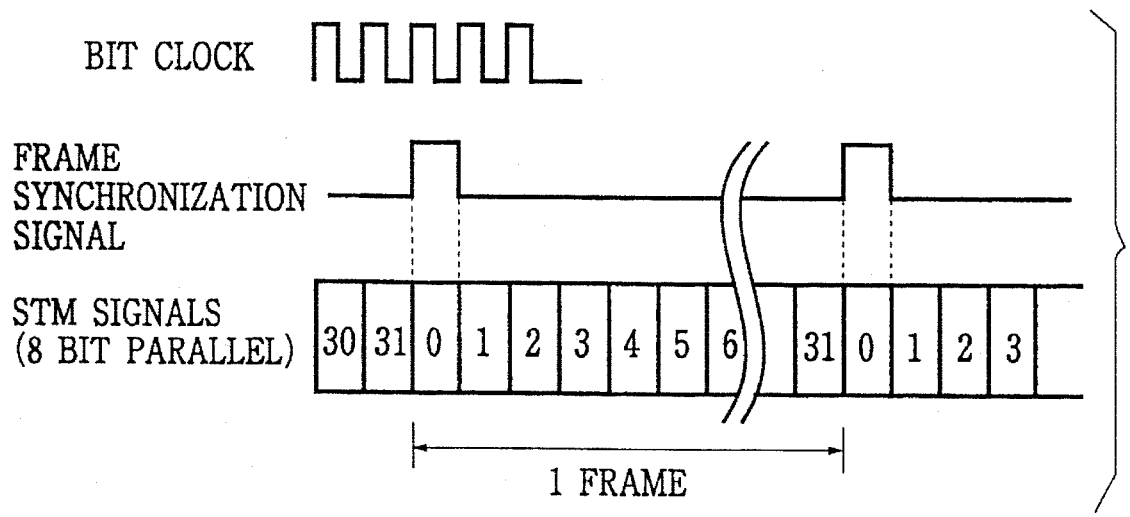
FIG. 6 is a timing chart for the STM signals and the frame synchronization signal entered into the ATM cell assembly device of FIG. 4.

In a case where the signals with each frame divided into 32 STM time slots are entered as the STM signals, a frame synchronization signal indicating a head of each frame is also entered along with the STM signals for each frame, as indicated in the timing chart of FIG. 6. On the other hand, in a case the CBR signals having arbitrary speed are entered as the STM signals, there is no need to enter this kind of the signal indicating a head of a frame. In this second embodiment, a case of the signals with each frame divided into 32 STM time slots will be referred to as an STM frame mode, while a case of the CBR signals with arbitrary speed will be referred to as a CBR mode, to distinguish these two cases. Either one of these modes can be selected freely from the external as well as from the control unit 14.

In the STM frame mode, the STM frame processor 101 extracts the data of those time slots which are specified by the control unit 14 in advance from each STM frame, and outputs the extracted data to the buffer interface 102. In addition, when the frame synchronization signal is detected along with the STM signals, the synchronization information in a form of the detected frame synchronization signal is also outputted to the buffer interface 102.

In the CBR mode, the STM frame processor 101 disregards the STM frames in the entered STM signals, and outputs all the data in the entered STM signals to the buffer interface 102. In addition, when the synchronization signal of some kind is detected along with the STM signals, the synchronization information in a form of the detected synchronization signal is also outputted to the buffer interface 102.

The buffer interface 102 receives the data in the STM signals and the synchronization information from the STM frame processor 101 and outputs them together to the buffer unit 12.

The buffer unit 12 is the FIFO memory formed by the dual port RAM as already mentioned above, and has the capacity of storing the data for two to three ATM cells. This buffer unit 12 writes the data outputted from the STM processing unit 11 at a clock on the STM side, and reads the stored data to the ATM processing unit 13 at a clock on the ATM side.

Figure 7:
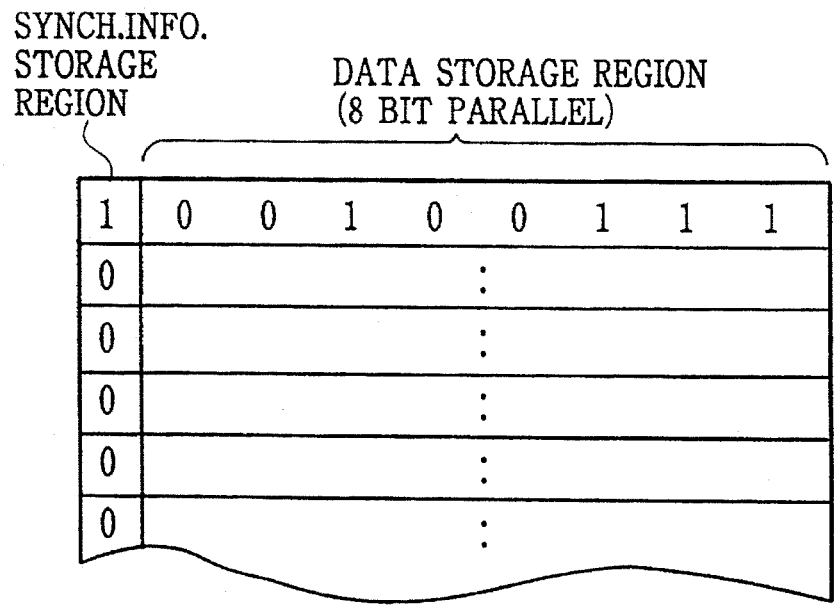
FIG. 7 is a diagrammatic illustration of stored data format in the buffer unit in the ATM cell assembly device of FIG. 4.

In this buffer unit 12, the data of the STM signals and the synchronization information are stored in correspondence with each other, in a format indicated in FIG. 7.

Figure 8:
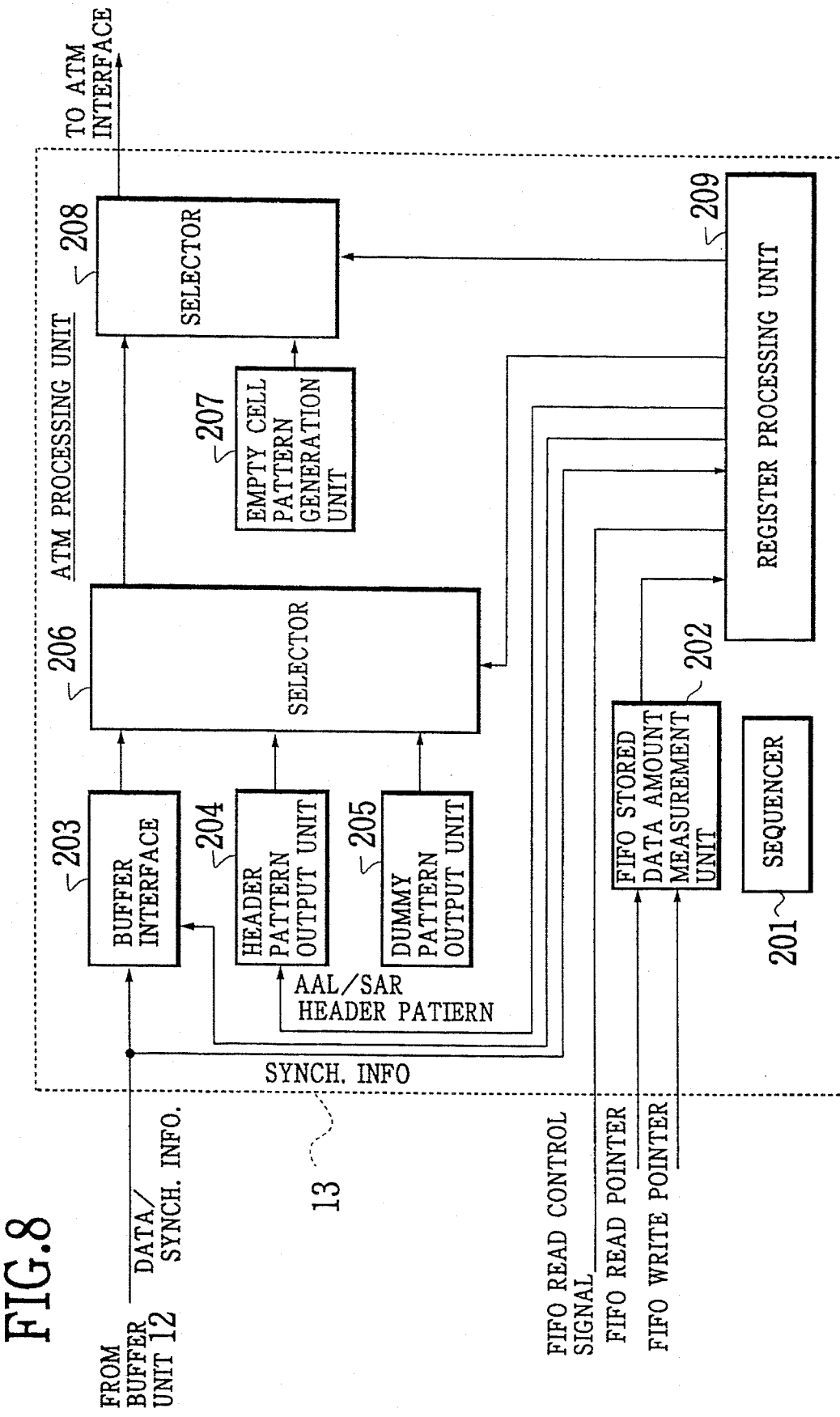
FIG. 8 is a diagram of an ATM processing unit in the ATM cell assembly device of FIG. 4.

On the other hand, the ATM processing unit 13 has a detailed configuration as shown in FIG. 8, which comprises a sequencer 201, a FIFO stored data measurement unit 202, a buffer interface 203, a header pattern output unit 204, a dummy pattern output unit 205, a selector 206, an empty cell pattern output unit 207, a selector 208, and a register processing unit 209, each of which will now be described.

This ATM processing unit 13 carries out the sequential operations for processing each ATM cell in the ATM cell cycles according to the sequencer 201, where each ATM cell cycle is equal to 53 clock cycle in this case as the internal circuit is operating in the 8 bit parallel mode.

The FIFO stored data amount measurement unit 202 is a module for constantly measuring the data amount such as the number of words currently stored in the buffer unit 12 in real-time, and outputting the result of the measurement to the register processing unit 209.

The buffer interface 203 has a function of acquiring the data from the buffer unit 12 in accordance with the command from the register processing unit 209, and supplying them to the selector 206.

The header pattern output unit 204 is a module for generating a header pattern for the ATM cell to be assembled, where the header pattern to be generated includes the ATM cell header and the AAL/SAR (ATM Adaptation Layer/Segmentation And Re-assembly sub-layer) header. In this second embodiment, one pattern can be selected at one time for the VPI (Virtual Path Identification) and the VCI (Virtual Channel Identification) in the ATM cell header to be generated, and this pattern is specified from the control unit 14 at a time of the call set up. Also, the AAL/SAR header to be generated is supplied from the the register processing unit 209 one by one.

The dummy pattern output unit 205 is a module for outputting the dummy pattern to be loaded into a remaining space in the payload section of the ATM cell in a case the loading of the data into the payload section is carried out in a manner of the partial filling.

The selector 206 is a module for selectively outputting an appropriate one of the data to be loaded into the payload section entered from the buffer interface 203, the header pattern entered from the header pattern output unit 204, and the dummy pattern entered from the dummy pattern output unit 205, under the control of the register processing unit 209. The data outputted from this selector 206 is in a form of the ATM cell, so that it is already a valid cell pattern that can be outputted to the transmission path.

The empty cell pattern generation unit 207 is a module for generating the empty cell pattern to be outputted instead of the valid cell pattern whenever it is judged that a sufficient amount of data to assemble the valid ATM cell are not yet accumulated in the buffer unit 12 within one cycle of the sequencer 201 by the FIFO stored data amount measurement unit 202 and the register processing unit 209.

The selector 208 is a module for selectively outputting an appropriate one of the valid cell pattern entered from the selector 206 and the empty cell pattern entered from the empty cell pattern generation unit 207, under the control of the register processing unit 209.

The register processing unit 209 looks up the measurement result of the FIFO stored data amount measurement unit 202 at an end of every cycle of the sequencer 201, and judges whether the sufficient amount of data to be loaded into the payload section to assemble the valid ATM cell (which will be referred hereafter as sufficient loading data amount) are already accumulated in the buffer unit 12 or not.

In case it is judged that the data not less than the sufficient loading data amount are already accumulated in the buffer unit 12, the register processing unit 209 generates the appropriate AAL/SAR header by processing its internal registers, and supplies it to the header pattern output unit 204, and controls the buffer interface 203 to take out the necessary amount of data to assemble the valid ATM cell from the buffer unit 12, while extracting the synchronization information stored in correspondence to the data taken out from the buffer unit 12 and matching it with its own synchronization information to judge whether the STM processing unit 11 and the ATM processing unit 13 are synchronized or not. Then, the register processing unit 209 assembles the valid ATM cell by merging the data taken out from the buffer unit 12 with the header pattern entered from the header pattern output unit 204 and the dummy pattern entered from the dummy pattern output unit 205 by appropriately controlling the selector 206, and outputs the obtained valid ATM cell to the transmission path by controlling the selector 208.

On the other hand, in case it is judged that the data not less than the sufficient loading data amount are not yet accumulated in the buffer unit 12, the register processing unit 209 controls the selector 208 to output the empty cell pattern generated by the empty cell pattern generation unit 207.

In the above described operation, both of the valid cell pattern generated by using the buffer interface 203, the header pattern output unit 204, and the dummy pattern output unit 205, and the empty cell pattern generated by using the empty cell pattern generation unit 207 are generated in the identical phase in accordance with the sequencer 201.

In further detail, the register processing unit 209 contains the following circuit elements (not shown):

(1) An lcs register for registering an "lcs" indicating a length of CS-PDU (Convergence Sub-layer Protocol Data Unit) specified from the control unit 14 at a time of the call set up;

(2) An LOC register for registering an "LOC" indicating a length of CS-PDU that is going to be outputted at an end of a sequencer cycle;

(3) A counter SNC for counting an SN (Sequence Number) contained in the AAL/SAR header;

(4) An LP register for registering an "LP" indicating a location of a border between the CS-PDUs for the cell to be outputted at the next sequencer cycle or a location of a border between the CS-PDU and the dummy data;

(5) A COF register for registering the data amount to be taken out from the buffer unit 12 in the next sequencer cycle (i.e., the sufficient loading data amount for the next ATM cell to be outputted);

(6) A CSI register for registering a flag "CSI" to be attached when the ATM cell to be outputted (or to be outputted next) contains a head of the CS-PDU;

(7) A pointer "P" for indicating a location of a border of the CS-PDU within the payload section of the ATM cell when the head of the CS-PDU is contained in the ATM cell to be outputted (or to be outputted next); and (8) A calculation circuit for calculating error correction codes and a parity according to the obtained CSI and SN.

Figure 9:
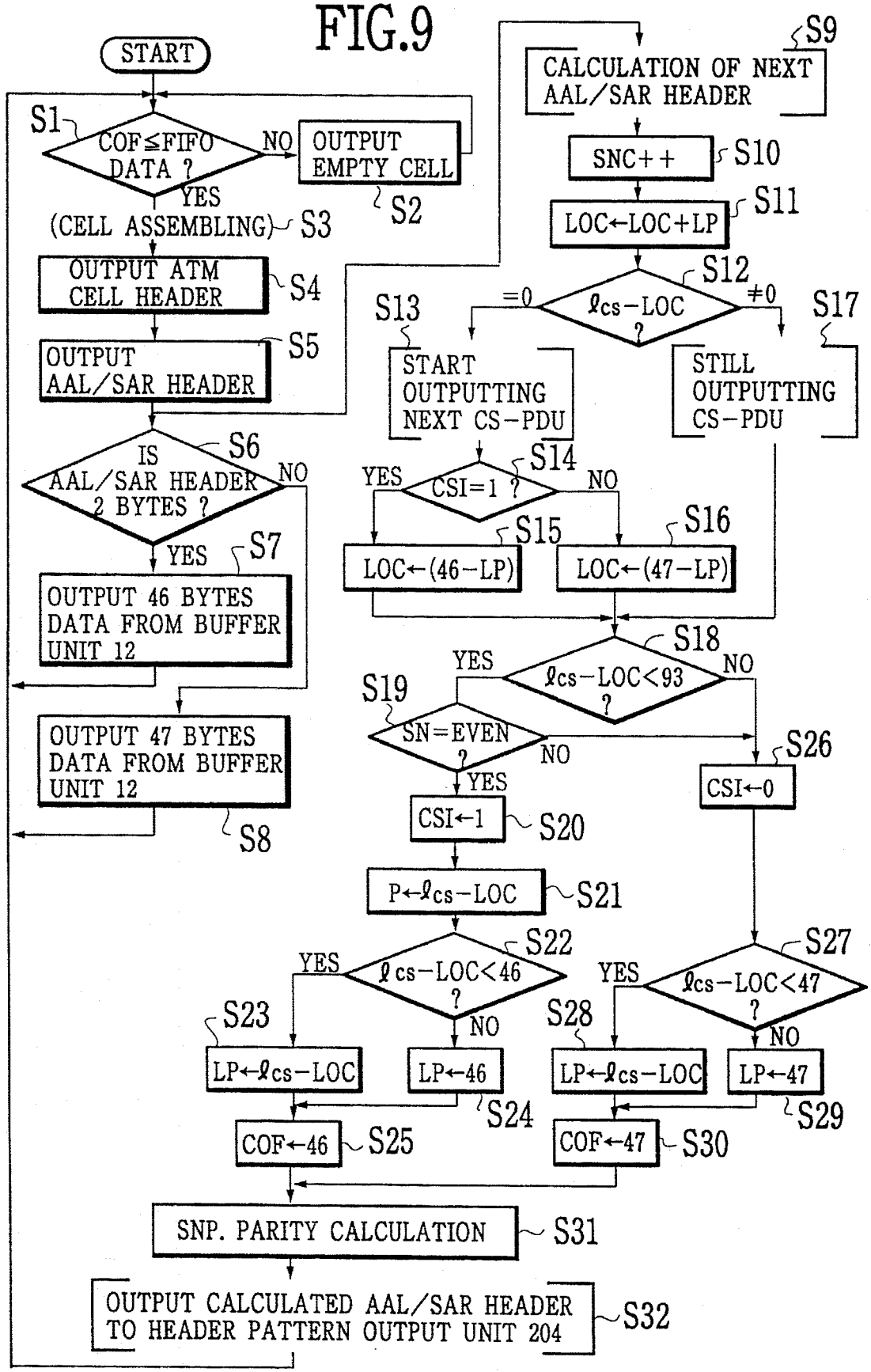
FIG. 9 is a flow chart for the ATM cell assembling operation in the ATM cell assembly device of FIG. 4 in the case when the partial filling is not used.

Then, the register processing unit 209 executes the algorithm of FIG. 9 by using these circuit elements to generate the AAL/SAR header required in assembling the valid ATM cell pattern, while taking out the necessary data from the buffer unit 12 by transmitting the read out control signal and outputting the appropriate one of the valid cell pattern and the empty cell pattern to the transmission path in a manner described above.

On the other hand, the control unit 14 notifies the various information either specified externally or prescribed in its internal ROM to the STM processing unit 11 and the ATM processing unit 13, while controlling the operations of the STM processing unit 11, the buffer unit 12, and the ATM processing unit 13.

Here, the various information to be notified from the control unit 14 includes an information indicating which data at which position in the STM frame is to be extracted and loaded into the payload section of the valid ATM cell, values of the various fields in the valid ATM cell header such as those of the VPI, VCI, PT (Payload Type), CLP (Cell Loss Priority), HEC (Header Error Control), etc., the CS-PDU length, and an information indicating whether or not the partial filling is to be used in the ATM cell assembling.

Now, the ATM cell assembling operation in this ATM cell assembly device of the second embodiment will be described in detail.

In case of the STM frame mode, as the data to be transmitted are entered, the STM processing unit 11 looks up the STM synchronization signal entered along these data to extract the necessary slots, and stores the extracted slots into the buffer unit 12 along with the synchronization information in a form of the entered STM synchronization signal through the buffer interface 102. On the other hand, in case of the CBR mode, the STM processing unit 11 regards the number of time slots in the STM frame entered in the STM frame mode as "32", and stores all the entered data into the buffer unit 12 through the buffer interface 102, along with the synchronization information in a form of the externally supplied synchronization signal if any. All of these operations in the STM processing unit 11 are carried out according to the clock on the STM side.

The ATM processing unit 13 is operated in the cell cycle of the sequencer 201 provided therein, to calculate the sufficient loading data amount (COF) to be loaded into the payload section of the valid ATM cell to be outputted next before the end of each cycle, and compares this COF with the FIFO stored data amount of the buffer unit 12 measured by the FIFO stored data amount measurement unit 202. Then, in a case it is judged that the data not less than the sufficient loading data amount are already accumulated in the buffer unit 12, the ATM processing unit 13 assembles the valid ATM cell according to the procedure of the flow chart shown in FIG. 9 to be described below, and outputs the obtained valid ATM cell to the transmission path. On the other hand, in case it is judged that the data not less than the sufficient loading data amount are not yet accumulated in the buffer unit 12, no action is made with respect to the buffer unit 12, and the empty cell pattern generated by the empty cell pattern generation unit 207 is outputted to the transmission path.

Next, with reference to the flow chart of FIG. 9, an algorithm for generating the AAL/SAR header and assembling the valid ATM cell for a case of not using the partial filling will be described in detail.

First, at an end of each cell cycle of the sequencer 201, the sufficient loading data amount (COF) to be loaded into the payload section of the valid ATM cell to be outputted next registered in the COF register is compared with the FIFO stored data amount of the buffer unit 12 measured by the FIFO stored data amount measurement unit 202 at the step S1.

Then, in case it is judged that the data not less than the sufficient loading data amount are not yet accumulated in the buffer unit 12, no action is made with respect to the buffer unit 12, and the empty cell pattern generated by the empty cell pattern generation unit 207 is outputted to the transmission path at the step S2, and the process returns to the step S1.

On the other hand, in case it is judged that the data not less than the sufficient loading data amount are already accumulated in the buffer unit 12, the process proceeds to the cell assembling of the steps S4 to S8 at S3, and the ATM cell header and the AAL/SAR header are outputted from the header pattern output unit 204 at the steps S4 and S5, respectively.

Then, at step S6, whether the currently outputted AAL/SAR header is 2 bytes or not is judged by looking up the value of CSI in the currently outputted AAL/SAR header. In case it is 2 bytes, i.e., when CSI=1, next at the step S7, the 46 bytes data are outputted from the buffer unit 12 and merged with the ATM cell header and the AAL/SAR header outputted at the steps S4 and S5 to form the valid ATM cell, and the process returns to the step S1. On the other hand, in case it is not 2 bytes, i.e., when CSI=0, next at the step S8, the 47 bytes data are outputted from the buffer unit 12 and merged with the ATM cell header and the AAL/SAR header outputted at the step S4 and S5 to form the valid ATM cell, and the process returns to the step S1.

In parallel to the steps S6 to S8, the process also proceeds to the calculation of the AAL/SAR header to be attached to the valid ATM cell to be outputted next of the steps S10 to S32 at S9.

Namely, at the step S10, the counting of the counter SNC is incremented, and then at the step S11, the value of LOC indicating a length of CS-PDU that is going to be outputted at an end of the current sequencer cycle is calculated by adding LP registered in the LP register to the previous value of LOC registered in the LOC register.

Next, at the step S12, whether one CS-PDU is going to be outputted completely in the current sequencer cycle or not is judged by checking whether the value of (lcs–LOC) is equal to zero or not.

When (lcs–LOC) is equal to zero, it is judged that one CS-PDU is going to be outputted completely in the current sequencer cycle at S13, and depending on the value of CSI registered in the CSI register determined at the step S14, the value of LOC in the LOC register is set to "46–LP" when CSI=1, i.e., when the payload section is 46 bytes at the step S15, or to "47–LP" when CSI=0, i.e., when the payload section is 47 bytes at the step S16, and the process proceeds to the next step S18.

When (lcs–LOC) is not equal to zero at the step S12, it is judged that one CS-PDU is not going to be outputted completely in the current sequencer cycle at S17, and the process proceeds to the next step S18.

At the step S18, whether there is a border between the CS-PDUs in either one of the next cell and the next to the next cell or not is judged by checking whether the value of (lcs–LOC) is less than "93" or not.

When (lcs–LOC) is less than "93", it is judged that there is a border between the CS-PDUs in either one of the next cell and the next to the next cell, and whether the value of SN indicated by the counter SNC is an even number or not is determined at the step S19. If it is an even number, the value of CSI in the CSI register is updated to "1" at the step S20, and the value of the pointer P is set to (lcs–LOC) at the step S21. Then, at the step S22, whether there is a border between the CS-PDUs in the next cell or not is judged by checking whether the value of (lcs–LOC) is less than "46" or not. When (lcs–LOC) is less than "46", it is judged that there is a border between the CS-PDUs in the next cell and the value of LP in the LP register is set to (lcs–LOC) at the step S23, whereas otherwise the value of LP in the LP register is set to "46" at the step S24. Then, after either one of the steps S23 and S24, the value of COF in the COF register is also set to "46" at the step S25.

On the other hand, when (lcs–LOC) is not less than "93" at the step S18 or when the value of SN is not even at the step S19, next at the step S26, the value of CSI in the CSI register is set to "0" at the step S26. Then, at the step S27, whether there is a border between the CS-PDUs in the next cell or not is judged by checking whether the value of (lcs–LOC) is less than "47" or not. When (lcs–LOC) is less than "47", it is judged that there is a border between the CS-PDUs in the next cell and the value of LP in the LP register is set to (lcs–LOC) at the step S28, whereas otherwise the value of LP in the LP register is set to "47" at the step S29. Then, after either one of the steps S28 and S29, the value of COF in the COF register is also set to "47" at the step S30.

Figure 11A:
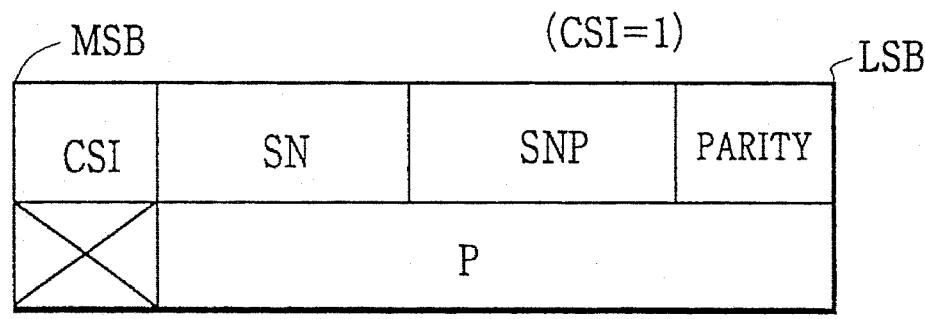
FIGS. 11A and 11B are diagrammatic illustrations of 2 bytes and 1 byte AAL/SAR headers, respectively, used in the ATM cell assembly device of FIG. 4.
Figure 11B:
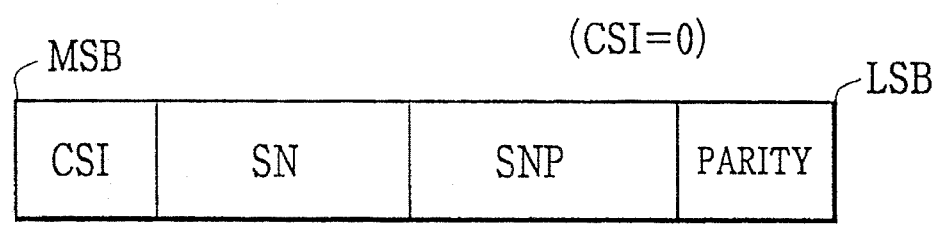

Next, after either one of the steps S25 and S30, an SNP (Sequence Number Protection) and a parity are calculated from the values of CSI and SN determined up to this point at the step S31, and the AAL/SAR header in a form of FIG. 11A in a case CSI=1 or of FIG. 11B in a case CSI=0 is obtained from the values of CSI, SN, P, SNP, and the parity determined up to this point and outputted to the header pattern output unit 204 at the step S32, and the process returns to the step S1.

Figure 10:
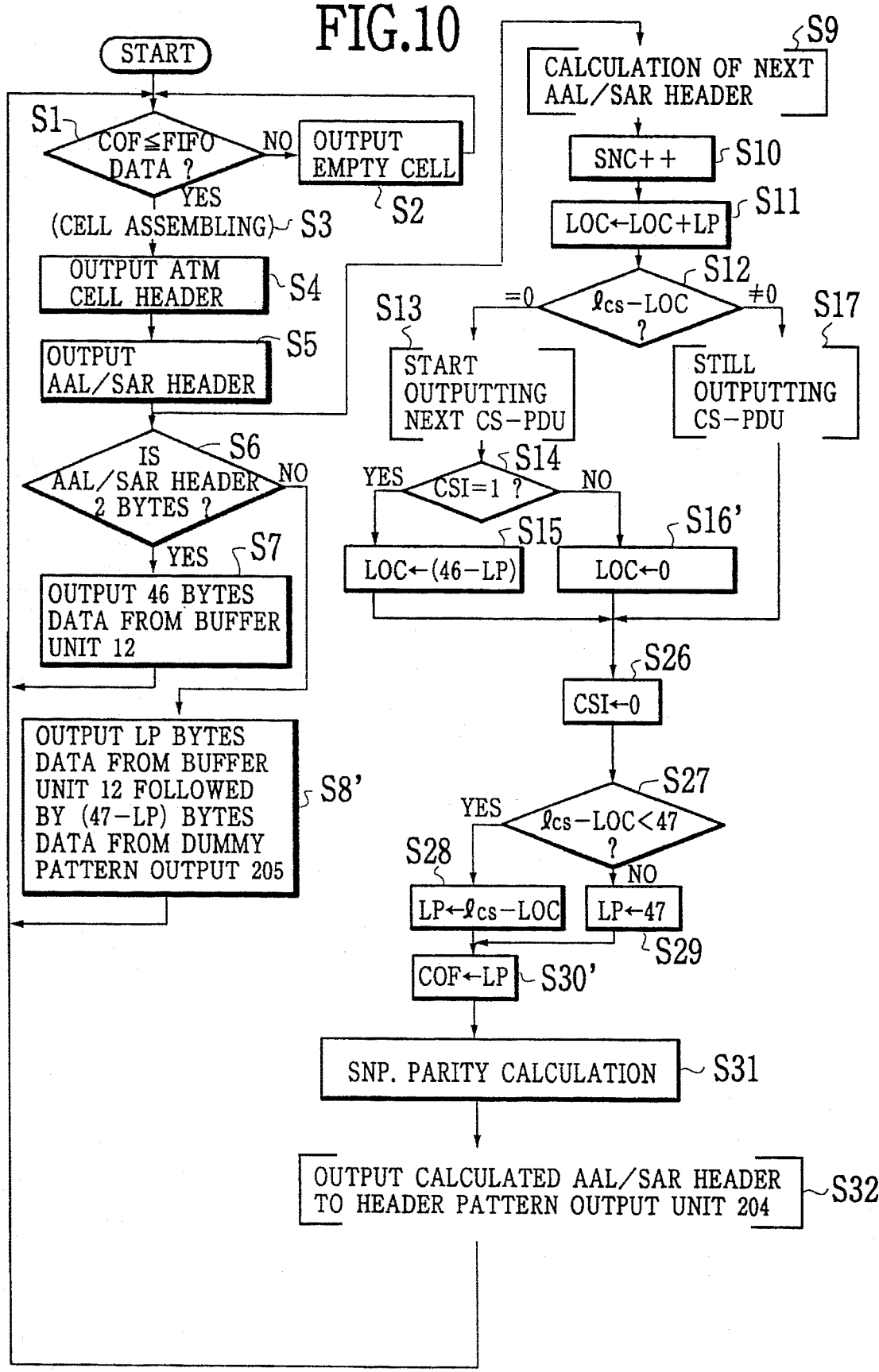
FIG. 10 is a flow chart for the ATM cell assembling operation in the ATM cell assembly device of FIG. 4 in the case when partial filling is used.

In case the partial filling is used, the algorithm for generating the AAL/SAR header and assembling the valid ATM cell is modified as shown in FIG. 10 as follows.

In this case, the value of the partial filling to be used is set to the lcs register from the control unit 14 in advance.

Then, in the cell assembling process, the step S8 in the flow chart of FIG. 9 is replaced by the step S8' in which an output of the LP bytes data from the buffer unit 12 followed by an output of the (47–LP) bytes data from the dummy pattern output unit 205 is made.

Also, in the AAL/SAR header calculation process, the step S16 in the flow chart of FIG. 9 is replaced by the step S16' in which the value of LOC in the LOC register is set to zero, and the step S30 in the flow chart of FIG. 9 is replaced by the step S30' in which the value of COF in the COF register is set to the value of LP in the LP register, while the steps S18 to S25 in the flow chart of FIG. 9 are omitted such that the process proceeds directly from either one of the steps S15 and S16' to the step S26 when (lcs–LOC) is equal to zero at the step S12, and from the step S12 to the step S26 otherwise.

As described, according to the ATM cell assembly device according to this second embodiment, when the STM processing unit 11 is operated in the STM frame mode, the data of the any desired time slots in the STM signals can be stored in the buffer unit 12 and then loaded into the payload section of the ATM cell, so that the STM signals of the already existing STM communication devices can be put into the ATM cells at the greater flexibility. In addition, the single configuration of FIG. 4 is applicable to the ATM cell assembling of any data size from that of just one slot to that of any desired number of time slots.

Also, when the STM processing unit 11 is operated in the CBR mode, the input data from the STM side can have any desired speed, so that it becomes possible to realize a flexible speed-independent ATM cell assembly device. In particular, as the buffer unit 12 functions as the FIFO memory formed by the dual port RAM, it becomes possible to realize the speed (clock) transfer from the STM side to the ATM side by means of this buffer unit 12. Here, however, it should be obvious that the operation speed on the STM side cannot exceed the operation speed on the ATM side. To be specific, in the exemplary situation used in the above description, the upper bound for the operation speed on the STM side is set by the operation speed on the ATM side multiplied by 47/53, so that the operational frequency ratio for the STM and ATM sides can be set arbitrarily only within this limit in this second embodiment.

Moreover, just as in the first embodiment described above, the valid ATM cell is assembled whenever the data not less than the sufficient loading data amount are accumulated in the buffer unit 12, and otherwise the empty cells are filled in, so that the desired full ATM cell flow with desired cell output cycles can be obtained by assembling the ATM cell from the input data entered at an arbitrary speed, without being restricted by the speed of the input data and requiring an additional hardware such as a speed matching buffer.

In addition, since the operation speed on the ATM side is faster than the operation speed on the STM side, the buffer unit 12 is not going to store more than a certain amount of input data and therefore its capacity can be relatively small, which also contributes to the reduction of the amount of hardware.

It is to be noted that the second embodiment described above can be modified variously, as follows.

(1) The value of the lcs register may not necessarily be equal to the value of the CS-PDU length on the STM side, and can be the value of the CS-PDU length multiplied by any integer. In this case, this integer multiplied CS-PDU length is going to be treated as the CS-PDU length in the ATM processing unit 13. These values can be set up externally through the control unit 14. For example, the CS-PDU length on the STM side can be set to the number of time slots in the STM frame which are to be loaded into the payload section of the ATM cell, while the CS-PDU length on the ATM side can be set to an integer multiple of the CS-PDU length on the STM side, such that the synchronization between the STM side and the ATM side is made in every several STM frames.

(2) The algorithm of FIGS. 9 and 10 described above can also be used for the ATM cell assembling in the CBR mode of the data in the frame structure.

(3) In a case the STM processing unit 11 and the ATM processing unit 13 become asynchronous, such that the data taken out from the buffer unit 12 as the top of CS-PDU at the ATM processing unit 13 do not contain any synchronization information on the STM side, it can be regarded as a case of the synchronization error and the ATM side can carry out the following exceptional processing. Namely, the ATM processing unit 13 notifies the control unit 14 about the occurrence of the error, and outputs the empty cells for the rest of this sequence. Then, in order to obtain the synchronized data for the next valid cell to be outputted, the data stored in the buffer unit 12 are sequentially read out for nothing until the data containing the synchronization information can be taken out. When the data containing the synchronization information is taken out, the reading from the buffer unit 12 is stopped, and the synchronized ATM cell assembling is carried out in the next sequence. Here, the judgement of the occurrence of the synchronization error must be made before the step S4 in the flow charts of FIGS. 9 and 10.

(4) When the overflow or the underflow occurs at the buffer unit 12, the similar exceptional processing can be carried out while notifying the control unit 14. Here, the exceptional processing includes the continual output of the empty cells until the normal state of the buffer unit 12 is recovered.

(5) In either one of the STM frame mode and the CBR mode, the ATM cell assembling can be carried out without the synchronization using the CSI bit. In this case, the partial filling number used in the ATM cell assembling using the partial filling is set to "47", for example. The setting regarding whether or not to carry out the synchronization using the CSI bit can be made externally through the control unit 14, at a time of the call set up for example.

(6) Instead of comparing the amount of data in the buffer unit 12 measured by the FIFO stored data amount measurement unit 202 with the sufficient loading data amount as described above, the remaining capacity of the buffer unit 12 can be compared with a prescribed threshold, such that it can be judged that more data than the necessary amount are accumulated in the buffer unit 12 whenever the remaining capacity of the buffer unit 12 is less than the threshold, only in which case the data are taken out from the buffer unit 12 to assemble the valid ATM cell.

(7) At the step S1 in the flow charts of FIGS. 9 and 10, the comparison can be made more loosely. For example, the value of COF can be compared with the FIFO stored data amount+$\alpha$, where $\alpha$ represents a tolerable margin.

(8) The values of VPI, VCI, PT, and CLP fields to be outputted can be made variable depending on the position in the STM frame time slot, such that a plurality of ATM connections can be set up and outputted at once.

(9) The ATM processing unit 13 can be operated in sequencer of an integer multiple of the cell cycle, or in the random logic of the cell cycle or its integer multiple, instead of the sequencer of the cell cycle as described above.

(10) The buffer unit 12 is not necessarily limited to the FIFO and the dual port RAM, and can be formed by other known memory elements.

(11) The above description has been given by using the STM/CBR data as the input data, but this second embodiment is equally applicable to the VBR (Variable Bit Rate) data as well as to the burst data.

(12) At the step S1 in the flow charts of FIGS. 9 and 10, in addition to the checking regarding the FIFO stored data amount of the buffer unit 12, the checking regarding the UPC parameters at the current cell output cycle may also be carried out, if desired.

Figure 12:
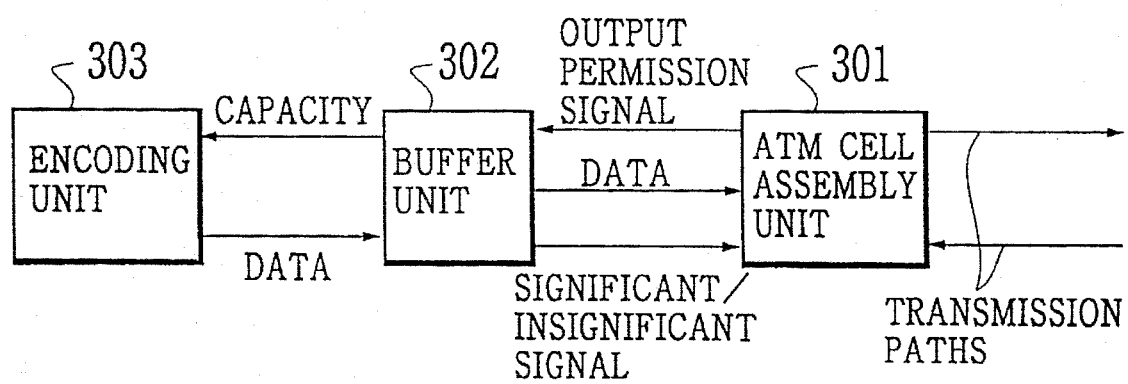
FIG. 12 is a schematic block diagram of a third embodiment of an ATM cell assembly device according to the present invention.

Referring now to FIG. 12, a third embodiment of an ATM cell assembly device according to the present invention will be described in detail.

In this third embodiment, the ATM cell assembly device comprises an encoding unit 303 for encoding data to be loaded into the ATM cells, a buffer unit 302 for temporarily storing the data encoded by the encoding unit 303, and an ATM cell assembly unit 301 for assembling the ATM cells from the data taken out from the buffer unit 302 and outputting the assembled ATM cells to a transmission path.

The ATM cell assembly unit 301 is a module for outputting an output permission signal for urging the buffer unit 302 to output the data stored therein, and then carrying out the ATM cell assembling according to the data taken out from the buffer unit 302 in response to the output permission signal and outputting the assembled ATM cells to the transmission path. In addition, this ATM cell assembly unit 301 also has functions of the call set up control and the ATM management such as the insertion of the OAM (Operation, Administration, and Maintenance) cells.

The buffer unit 302 is formed by a large capacity memory in a form of the dual port RAM, and notifies the currently remaining capacity to the encoding unit 303 in real-time. Here, the buffer unit 302 may notifies the amount of stored data instead of the currently remaining capacity. This buffer unit 302 stores the data encoded by the encoding unit 303, and outputs the stored data only when the output permission signal is received from the ATM cell assembly unit 301. Here, when the buffer unit 302 outputs the significant data to the ATM cell assembly unit 301, the buffer unit 302 also notifies the ATM cell assembly unit 301 that the currently outputted data are significant data by using a significant/insignificant data line provided in parallel to a data line. For example, the significant/insignificant signal can be set to an H level when the currently outputted data are the significant data.

In case the buffer unit 302 does not have a sufficient amount of data to be outputted when the output permission signal is received from the ATM cell assembly unit 301, the buffer unit 302 outputs insignificant data to the ATM cell assembly unit 301, and notifies the ATM cell assembly unit 301 that the currently outputted data are insignificant data by using the significant/insignificant data line in parallel. For example, the significant/insignificant signal can be set to an L level when the currently outputted data are the insignificant data.

The encoding unit 303 encodes the data to be loaded into the ATM cells such as the image data, and outputs the encoded data to the buffer unit 302. Here, the encoding is carried out at the VBR (Variable Bit Rate) mode, in which the encoding speed is controlled by the currently remaining capacity notified from the buffer unit 302. More specifically, when the currently remaining capacity notified from the buffer 302 is less than a prescribed threshold or the amount of stored data notified from the buffer unit 302 is greater than another prescribed threshold, the encoding speed is decreased by stopping the encoding in the high frequency range, such that the buffer overflow at the buffer unit 302 does not occur even when all the encoded data are outputted to the buffer unit 302. In this case, the stopping of the encoding in the high frequency range is indicated in the outputted data themselves, such that this fact can be notified to a receiver side terminal receiving these data. Here, it is also possible for the encoding unit 303 to be provided with a plurality of encoding speed levels, from which an appropriate one is selected according to the currently remaining capacity notified from the buffer unit 302, instead of controlling the encoding speed continuously. Also, the amount of data output from the encoding unit 303 may be controlled instead of the encoding speed.

Figure 13:
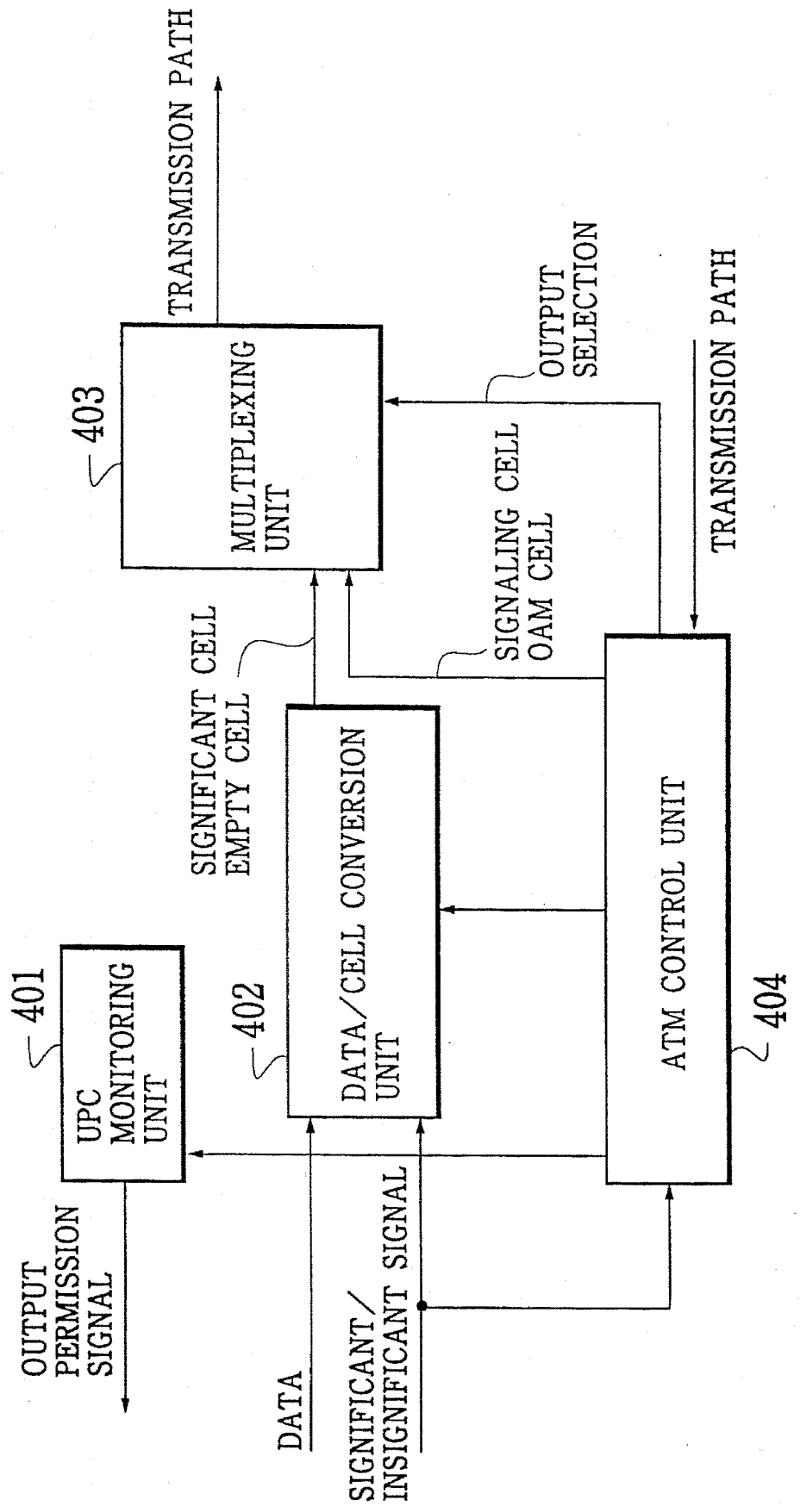
FIG. 13 is a diagram of an ATM cell assembly unit in the ATM cell assembly device of FIG. 12.

The ATM cell assembly unit 301 has a detailed configuration as shown in FIG. 13, which comprises a UPC monitoring unit 401 for outputting the output permission signal, a data/cell conversion unit 402 for receiving the data from the buffer unit 302 and producing the cells to be outputted to the transmission path, a multiplexing unit 403 for multiplexing the cells produced at the data/cell conversion unit 402 with other cells to be inserted, and an ATM control unit 404 for controlling the UPC monitoring unit 401, the data/ cell conversion unit 402, and the multiplexing unit 403, while supplying the other cells to be inserted to the multiplexing unit 403.

The UPC monitoring unit 401 is a module for outputting the output permission signal to the buffer unit 302 at the ATM cell output cycle such that the UPC (Usage Parameter Control) parameters determined at a time of the call set up through the ATM control unit 404 can be satisfied. Here, the output permission signal can be generated by using the known algorithm such as the leaky bucket algorithm or the sliding window algorithm which is operated at the ATM cell output cycle for example.

The data/cell conversion unit 402 assemble the ATM cell by attaching the ATM cell header and the adaptation layer header to the data received from the buffer unit 302, and outputs the assembled ATM cell to the multiplexing unit 403. If necessary, the data/cell conversion unit 402 also receives the information concerning the amount of data outputted from the buffer unit 302. For example, in case the data received from the buffer unit 302 ends in a middle of the payload section of the ATM cell to be assembled, the information indicating a position at which the data ends can be received from the buffer unit 302. Also, when no significant data are received from the buffer unit 302 or when the call is not set up, the data/cell conversion unit 402 generates the empty cells and outputs these empty cells to the multiplexing unit 403. For this purpose, the data/cell conversion unit 402 also receives the significant/insignificant signal from the buffer unit 302 in parallel to the data, so as to be able to distinguish the significant data and the the insignificant data.

The multiplexing unit 403 multiplexes the signaling cell and the OAM cell supplied from the ATM control unit 404 with the ATM cell or the empty cell outputted from the data/cell conversion unit 402 to obtain the ATM cell flow to be outputted to the transmission path.

The ATM control unit 404 exchanges the signaling cell with an ATM network at a time of the call set up to determine the UPC parameters, and notifies the determined UPC parameters to the UPC monitoring unit 401, and determines various parameters of the ATM cell header such as VPI and VCI and supplies the determined parameters to the data/cell conversion unit 402. In addition, the ATM control unit 404 supplies the signaling cell and the OAM cell to the multiplexing unit 403 whenever necessary.

Here, the OAM cell can be outputted only when the cell outputted from the data/cell conversion unit 402 is an empty cell, in which case the OAM cell can be outputted in a place of the empty cell outputted from the data/cell conversion unit 402. For this purpose, the ATM control unit 404 also receives the significant/insignificant signal from the buffer unit 302 so as to be able to judge whether the cell outputted from the data/cell conversion unit 402 is an empty cell or not.

Now, the ATM cell assembling operation in this ATM cell assembly device of the third embodiment will be described in detail.

Before the call set up is made, the the empty cells generated at the data/cell conversion unit 402 are outputted to the transmission path. Then, in case this ATM cell assembly device is on a calling terminal side, the signaling cell is generated at the ATM control unit 404 and exchanged with the ATM network and a called terminal through the transmission path at a time of a call set up. On the other hand, in case this ATM cell assembly device is on a called terminal side, the ATM control unit 404 receives and analyzes the signaling cell transmitted from the ATM network side through the transmission path and exchanges the signaling cell with the ATM network and the calling terminal at a time of the call set up. As a result of this exchange of the signaling cell at a time of the call set up, the UPC parameters and the ATM cell header parameters are determined, and the ATM control unit 404 supplies the determined UPC parameters and ATM cell header parameters to the UPC monitoring unit 401 and the data/cell conversion unit 402, respectively.

After the call is set up and the communication starts, the UPC monitoring unit 401 outputs the output permission signal at the ATM cell output cycle to the buffer unit 302, in accordance with the algorithm provided therein.

The buffer unit 302 outputs the data that can be loaded into the payload section of the ATM cell to be assembled to the data/cell conversion unit 402 of the ATM cell assembly unit 301 at the ATM cell output cycle, only when the data are stored therein and the output permission signal is received from the UPC monitoring unit 401 of the ATM cell assembly unit 301, while at the same time outputting the significant/insignificant signal in the H level indicating the significant data to the ATM cell assembly unit 301, in parallel to the data. Otherwise, the buffer unit 302 outputs the insignificant data to the ATM cell assembly unit 301, while at the same time outputting the significant/insignificant signal in the L level indicating the insignificant data to the ATM cell assembly unit 301, in parallel to the data.

The data/cell conversion unit 402 receives the data from the buffer unit 302 then assembles the ATM cell by attaching the ATM cell header produced in accordance with the ATM cell header parameters supplied from the ATM control unit 404 and the adaptation layer header to the received data, and outputs the assembled ATM cell to the multiplexing unit 403. On the other hand, when no significant data are received from the buffer unit 302, i.e., while the significant/insignificant signal is in the L level, the data/cell conversion unit 402 generates the empty cells and outputs the generated empty cells to the multiplexing unit 403.

The multiplexing unit 403 multiplexes the ATM cell or the empty cell outputted from the data/cell conversion unit 402 and the signaling cell and the OAM cell supplied from the ATM control unit 404 to obtain the ATM cell flow, and outputs the obtained ATM cell flow to the transmission path. Here, the ATM cell flow outputted to the transmission path is in a form observing the UPC parameters determined at a time of the call set up, since the ATM cell assembling is carried out for the data outputted from the buffer unit 302 in accordance with the output permission signal from the UPC monitoring unit 401 which is operated in accordance with the determined UPC parameters.

Meanwhile, the buffer unit 302 notifies the currently remaining capacity or the amount of stored data to the encoding unit 303 in real-time, such that the encoding unit 303 decreases the encoding speed by stopping the encoding in the high frequency range whenever the notified currently remaining capacity becomes less than the prescribed threshold or the notified amount of stored data becomes greater than another prescribed threshold, and increases the encoding speed whenever the notified currently remaining capacity becomes greater than the prescribed threshold or the notified amount of stored data becomes less than another prescribed threshold. In this manner, the buffer overflow at the buffer unit 302 can be prevented. Here, in case the encoding speed is changed, this fact is indicated in the encoded data themselves in order to notify this fact to the receiver side terminal.

Now, in case the deadlock occurs at the buffer unit 302 for some reason such as an extended absence of the output permission signal from the UPC monitoring unit 401, such that the buffer unit 302 is unable to store the data from the encoding unit 303 for an extended period of time, either the buffer unit 302 is reset, or an entire ATM cell assembly device including the ATM cell assembly unit 301 is reset.

Also, when there is a need to change the UPC parameters in some manner such as when the suppression of the amount of the outputted cells is requested from the ATM network side, this ATM cell assembly device can be easily and quickly adjusted to the new UPC parameters by simply updating the UPC parameters set up in the UPC monitoring unit 401 through the ATM control unit 404 to adjust the UPC parameters of the outputted ATM cell flow.

Figure 14:
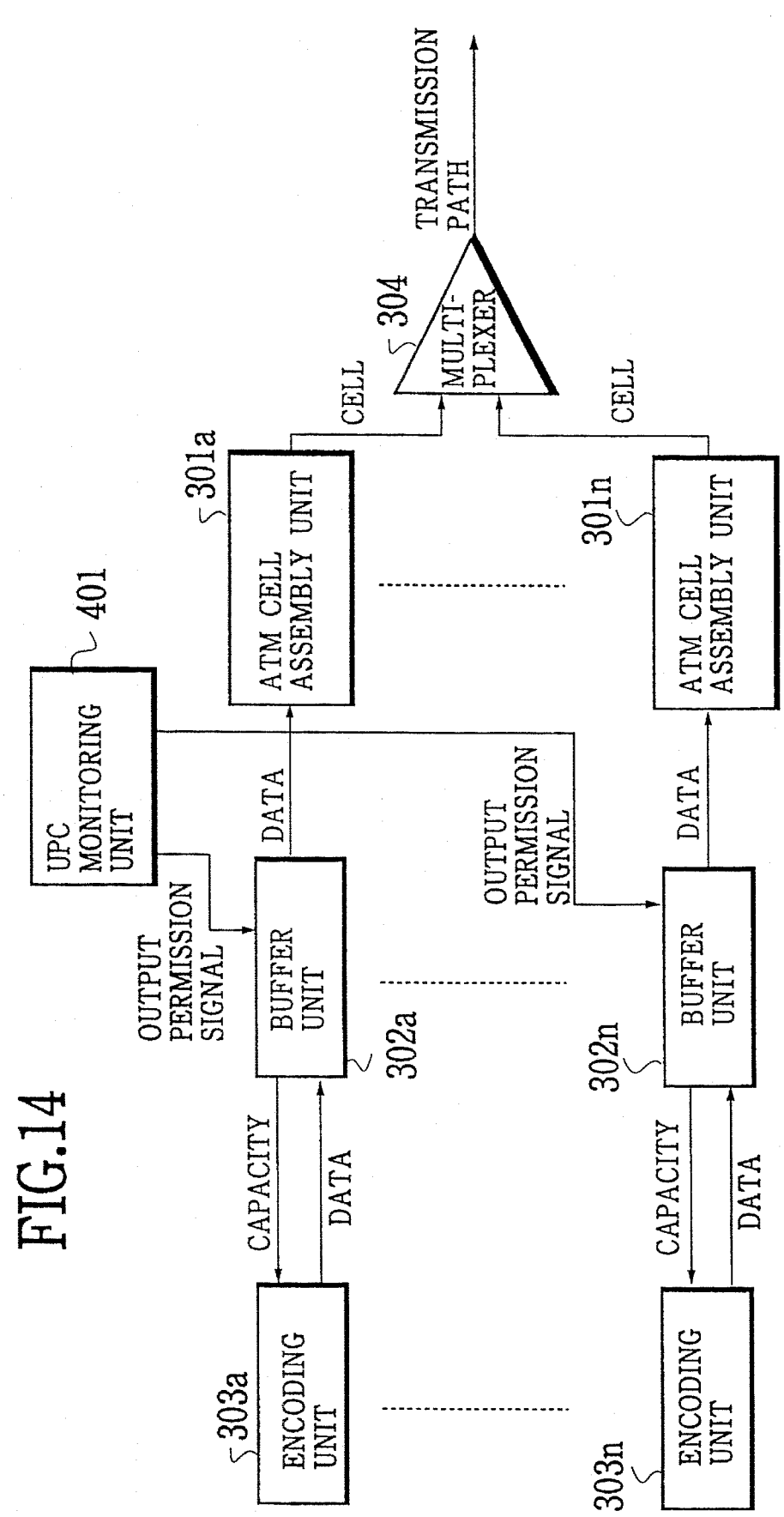
FIG. 14 is a block diagram of one possible modified configuration for the third embodiment of an ATM cell assembly device according to the present invention.
Figure 15:
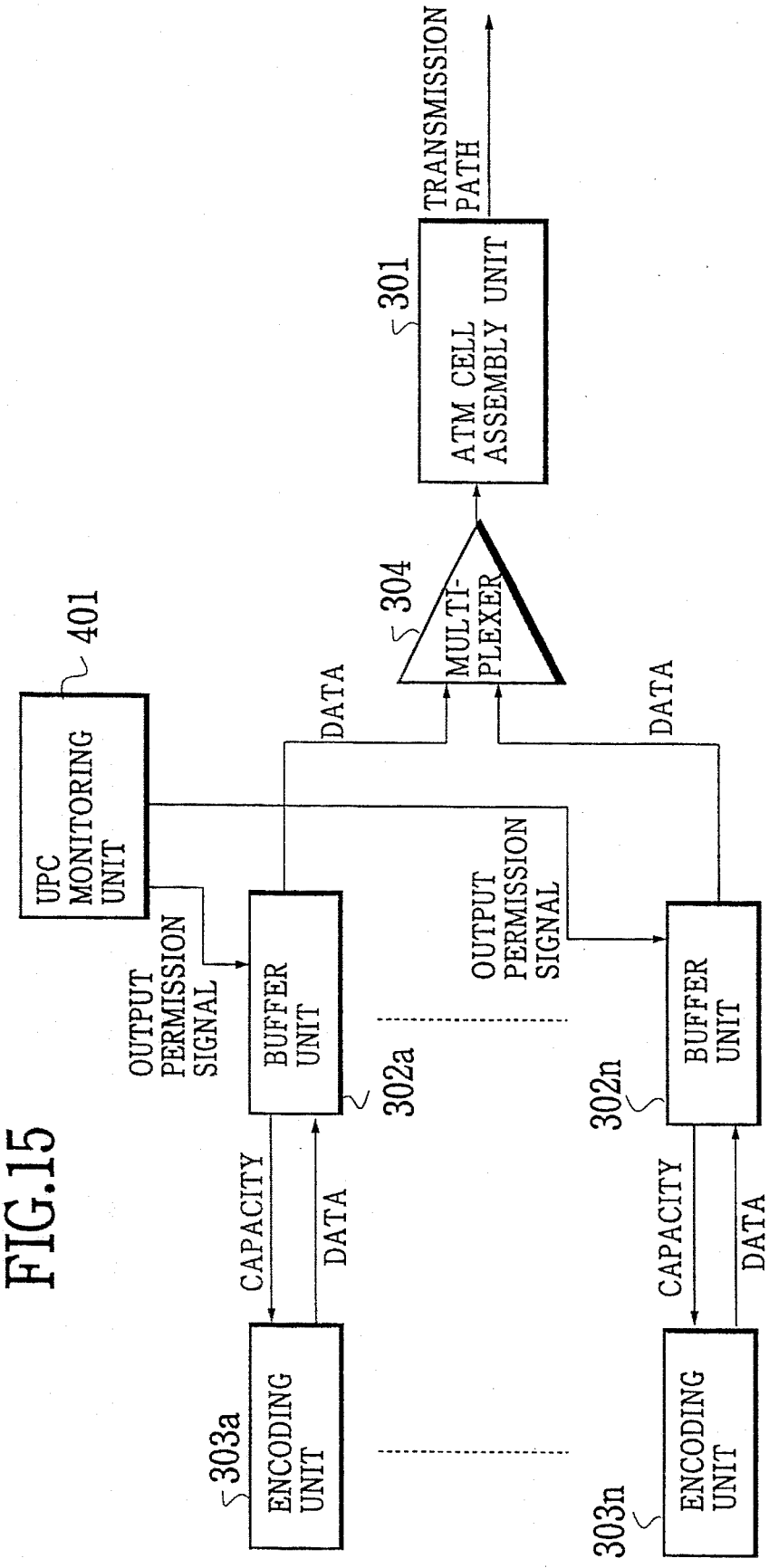
FIG. 15 is a block diagram of another possible modified configuration for the third embodiment of an ATM cell assembly device according to the present invention.

It is to be noted that, in a case involving a plurality of media to be ATM cell assembled as in case of the multi-media communication, a plurality of the ATM cell assembly devices in a configuration of FIG. 12 can be connected in parallel as shown in FIG. 14, by means of a multiplexer 304 provided on the output side of all the ATM cell assembly units 301a to 301n, while providing only one UPC monitoring unit 401 commonly to all the buffer units 302a to 302n, such that the determined UPC parameters can be observed by this configuration of FIG. 14 as a whole. Similarly, as shown in FIG. 15, the multiplexer 304 can be provided on the output side of all the buffer units 302a to 302n and only one ATM cell assembly unit 301 can be provided on the output side of the multiplexer 304, to achieve the same result as the configuration of FIG. 14. It is also possible to provide a plurality of the UPC monitoring units corresponding to a plurality of media such that each media can be controlled separately.

It is also to be noted that the output permission signal from the UPC monitoring unit 401 may be generated in accordance with the flow control by the GFC (Generic Flow Control), in addition to the UPC parameters.

As described, according to this ATM cell assembly device of the third embodiment, it becomes possible to carry out the data output from the buffer unit 302 and the ATM cell assembling at the ATM cell assembly unit 301 by observing the UPC parameters determined at a time of the call set up, so that the desired traffic shaping that is indispensable in the ATM communication can be realized.

In addition, there is no need to provide the buffer for the purpose of the traffic shaping separately, so that the reduction of the amount of hardware can also be achieved.

Moreover, the encoding speed or the amount of data output at the encoding unit 303 is controlled in accordance with the currently remaining capacity or the amount of stored data in the buffer unit 302, so that the buffer overflow at the buffer unit 302 can be prevented.

Furthermore, the UPC parameters of the outputted ATM cell flow can be changed easily and quickly by simply updating the UPC parameters set up in the UPC monitoring unit 401.

Figure 16:
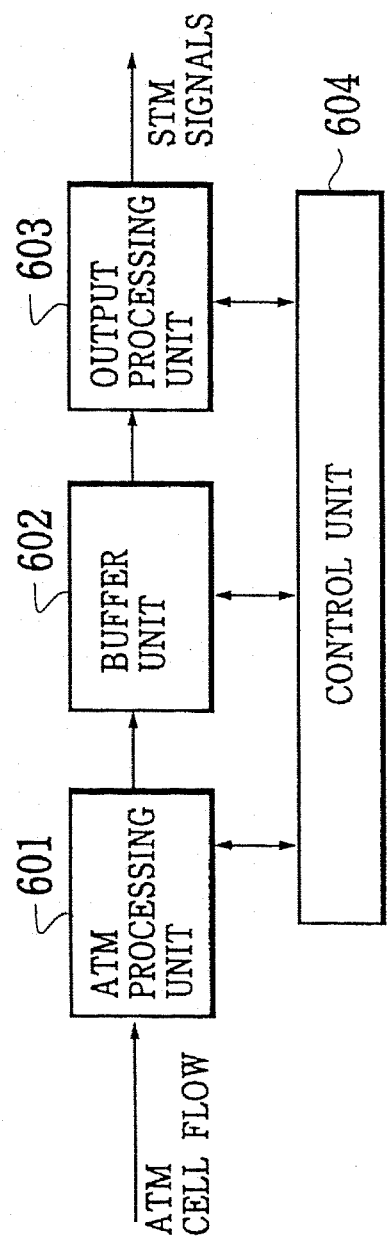
FIG. 16 is a schematic block diagram of one embodiment of an ATM cell disassembly device according to the present invention.

Referring now to FIG. 16, an embodiment of an ATM cell disassembly device according to the present invention will be described in detail.

This ATM cell disassembly device of this embodiment shown in FIG. 16 is for producing the STM signals such as the telephone signals from the entered ATM cell flow. In principle, the necessary cells are extracted from the entered ATM cells, and the necessary data are extracted from the payload sections of these extracted cells. These extracted data are loaded into selective ones of the time slots in the STM frame to obtain the STM signals in frame structure, or the STM signals without specific frame structure are reproduced from these extracted data, and the obtained STM signals are outputted.

In this embodiment, the ATM cell disassembly device generally comprises: an ATM processing unit 601 for receiving the externally supplied ATM cell flow and disassembling the received ATM cells; a buffer unit 602 connected with the ATM processing unit 601 for temporarily storing the output of the ATM processing unit 601; an output processing unit 603 connected with the buffer unit 602 for obtaining the desired STM signals to be outputted from the output of the buffer unit 602; and a control unit 604 for controlling the operations of the ATM processing unit 601, the buffer unit 602, and the output processing unit 603 in a manner described in detail below.

The ATM processing unit 601 extracts the data to be reproduced as the STM signals by cell disassembling of the ATM cells from the entered ATM cell flow, and outputs the extracted input data to the buffer unit 602, while also outputting the information regarding a head of CS-PDU as the synchronization of the adaptation layer, i.e., the information indicating a synchronization bit (CSI bit) contained in the adaptation layer header (AAL/SAR header), to the buffer unit 602.

The buffer unit 602 comprises a dual port RAM (2P-RAM), and functions as a FIFO (First-In First-Out) memory. In addition, this buffer unit 602 also has a function of speed conversion (clock conversion) between the speed on the ATM side and the speed on the STM side.

The output processing unit 603 reproduces the desired STM signals by loading the data taken out from the buffer unit 602 into the predetermined frame position of the STM frame, and outputs the obtained STM signals.

Figure 17:
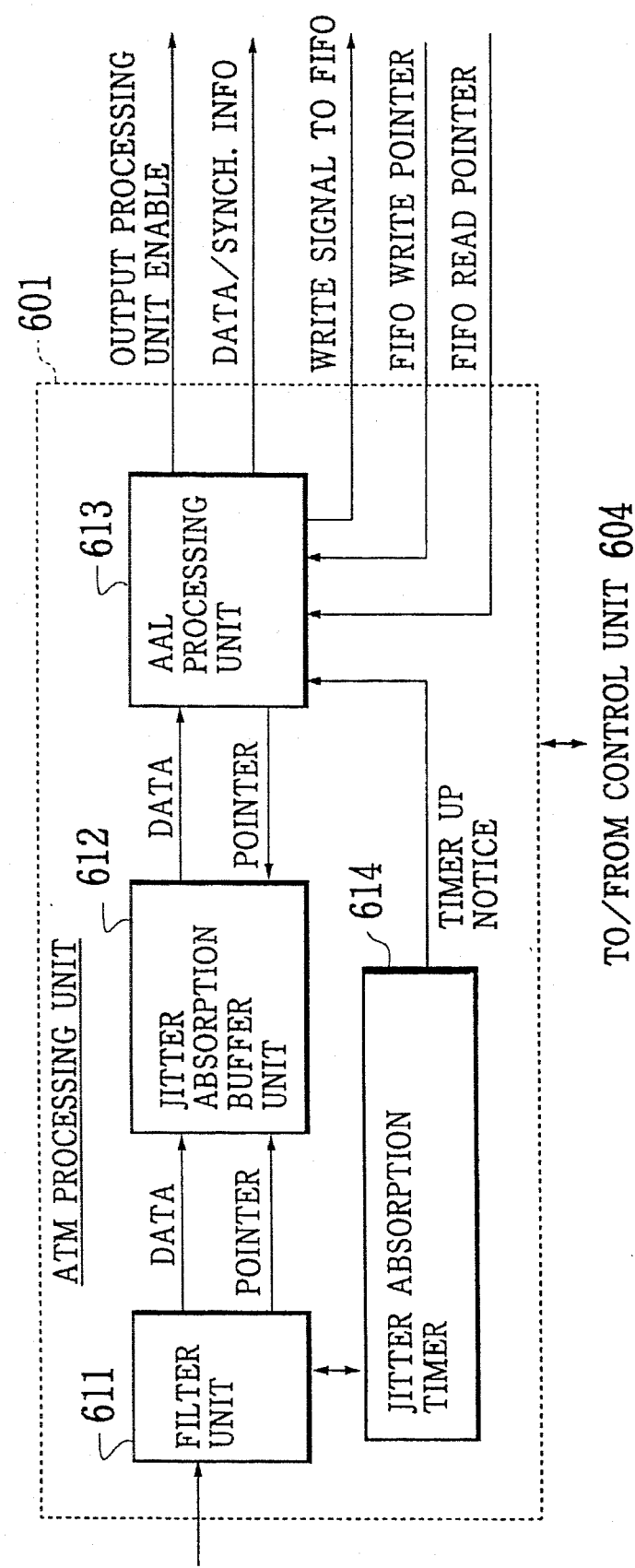
FIG. 17 is a diagram of an ATM processing unit in the ATM cell disassembly device of FIG. 16.

In further detail, the ATM processing unit 601 has a detailed configuration as shown in FIG. 17, which comprises a filter unit 611 receiving the entered ATM cell flow, a jitter absorption buffer unit 612 connected with the filter unit 611, an AAL (ATM Adaptation Layer) processing unit 613 connected with the jitter absorption buffer unit 612, and a jitter absorption timer 614 connected with the filter unit 611 and the AAL processing unit 613, all of which are operated at the same operation frequency as that of the entered ATM cell flow.

The filter unit 611 extracts those cells among the ATM cells entered in the 8 bit parallel mode which have the specific cell header pattern specified from the control unit 604 in advance. Here, the specific cell header pattern to be specified to the filter unit 611 is specified from the control unit 604 at a time of the call set up for example.

Figures 18, 19:
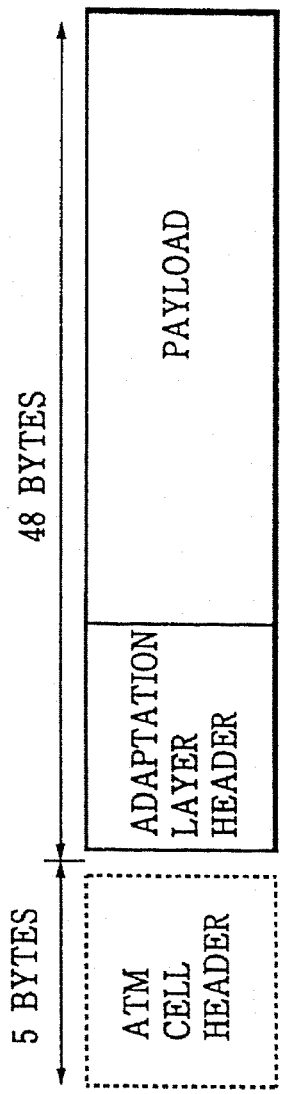
FIG. 18 is a diagrammatic illustration of the data format for the ATM cell used in the ATM cell disassembly device of FIG. 16.
FIG. 19 is a diagrammatic illustration of stored data format in the buffer unit in the ATM cell disassembly device of FIG. 16.

Then, as shown in FIG. 18, the filter unit 611 removes the 5 bytes ATM cell header from each of the extracted ATM cells, and outputs the remaining 48 bytes data containing an adaptation layer header (AAL/SAR header) and a payload to the jitter absorption buffer unit 612. The jitter absorption buffer unit 612 stores the data outputted from the filter unit 611 in a format shown in FIG. 19 in which the adaptation layer header and the payload are stored in two parallel columns of 1 byte size each. This format of FIG. 19 is adopted here in consideration of the access time required for a large capacity RAM forming the jitter absorption buffer unit 612. Also, this format of FIG. 19 is convenient for the AAL processing unit 613 when it is necessary to take out the adaptation layer header from the jitter absorption buffer unit 612, and then look up and analyze the taken out adaptation layer header to take out the corresponding payload data, while the adaptation layer header is of 1 byte size, because the first byte of the payload data can be taken out along with the adaptation layer header so that there is no need to make an access to the jitter absorption buffer unit 612 again solely for the purpose of taking out the payload data.

Here, the filter unit 611 begins to store the data into the jitter absorption buffer unit 612 in such an order that the storing is made for those cells having the specific cell header pattern in which the synchronization bit (CSI bit) in the adaptation layer header is in the ON state. To this end, the filter unit 611 has an SNP/parity calculation circuit for calculating an SNP (Sequence Number Protection) and the parity contained in the adaptation layer header such that, at a time of the start of the operation, the normal adaptation layer header is calculated for each cell with the specific cell header pattern by this SNP/parity calculation circuit, and the storing into the jitter absorption buffer unit 612 starts from those cells for which the ON state of the synchronization bit is verified by this calculation by the SNP/parity calculation circuit. Note that this SNP/parity calculation circuit may be shared with the AAL processing unit 613 as described below.

Also, the start of the storing of the data into the jitter absorption buffer unit 612 is notified from the filter unit 611 to the jitter absorption timer 614.

In addition, the filter unit 611 has counters for calculating the write address in the jitter absorption buffer unit 612, which are provided into two parts of the lower 6 bits counter and the upper bits counter, where the lower 6 bits counter specifies the count for each cell in units of either bytes or words, while the upper bits counter specifies the count in units of cells. Thus, the value of the upper bits counter is indicative of the number of cells stored in the jitter absorption buffer unit 612, and the AAL processing unit 613 and the jitter absorption timer 614 utilize the value of this upper bits counter.

The filter unit 611 carries out the storing of the data including the adaptation layer header and the payload into the jitter absorption buffer unit 612 whenever the cell arrives at the filter unit 611, regardless of the value of its cell header and of the arrival of the synchronization bit in the adaptation layer header at a time of the start of the operation. Here, however, for those cells for which the value of the cell header is different from the prescribed value or the synchronization bit in the adaptation layer header is in the OFF state at a time of the start of the operation, the increment of the upper bits part of the above described counter is not made after the storing of the data, such that these cells will be overwritten by the next arriving cells. Thus, effectively, the cells that can be stored in the jitter absorption buffer unit 612 are limited to the cells having the specific cell header pattern and the cells having the synchronization bit in the ON state at a time of the start of the operation.

The filter unit 611 is operated in the cell arrival cycle while the ATM cell is of the 53 bytes size, so that the filter unit 611 is actually operated according to the sequencer of 53 clock cycles activated by the signal indicating the head of the cell, which is provided within the filter unit 611. Here, however, in case of the occurrence of the error such as the abnormal cell length, the occurrence of the error is notified to the control unit 604, and the cell associated with the error is not stored in the jitter absorption buffer unit 612. In such a case, the increment of the upper bits part of the counter is also not made, and this sequencer within the filter unit 611 is reset.

The jitter absorption buffer unit 612 is formed by the large capacity RAM, which temporarily stores the data outputted from the filter unit 611 and outputs the stored data to the AAL processing unit 613. As shown in FIG. 19, this jitter absorption buffer unit 612 has each memory region of 16 bits=1 word size, and the data of each cell can be stored in 32 words. For this reason, each pointer from one of the filter unit 611 and the AAL processing unit 613 to the jitter absorption buffer unit 612 is formed by separate counters for the lower 6 bits and the upper bits, where the lower 6 bits counter is operated in units of words and activated by the sequencer, while the upper bits counter is operated in units of cells and makes at most one increment in one cell cycle. In the region of this jitter absorption buffer unit 612 in which the cells are not stored (i.e., the region starting from the 25th word), the other data such as the control data may be stored in addition.

Figure 20:
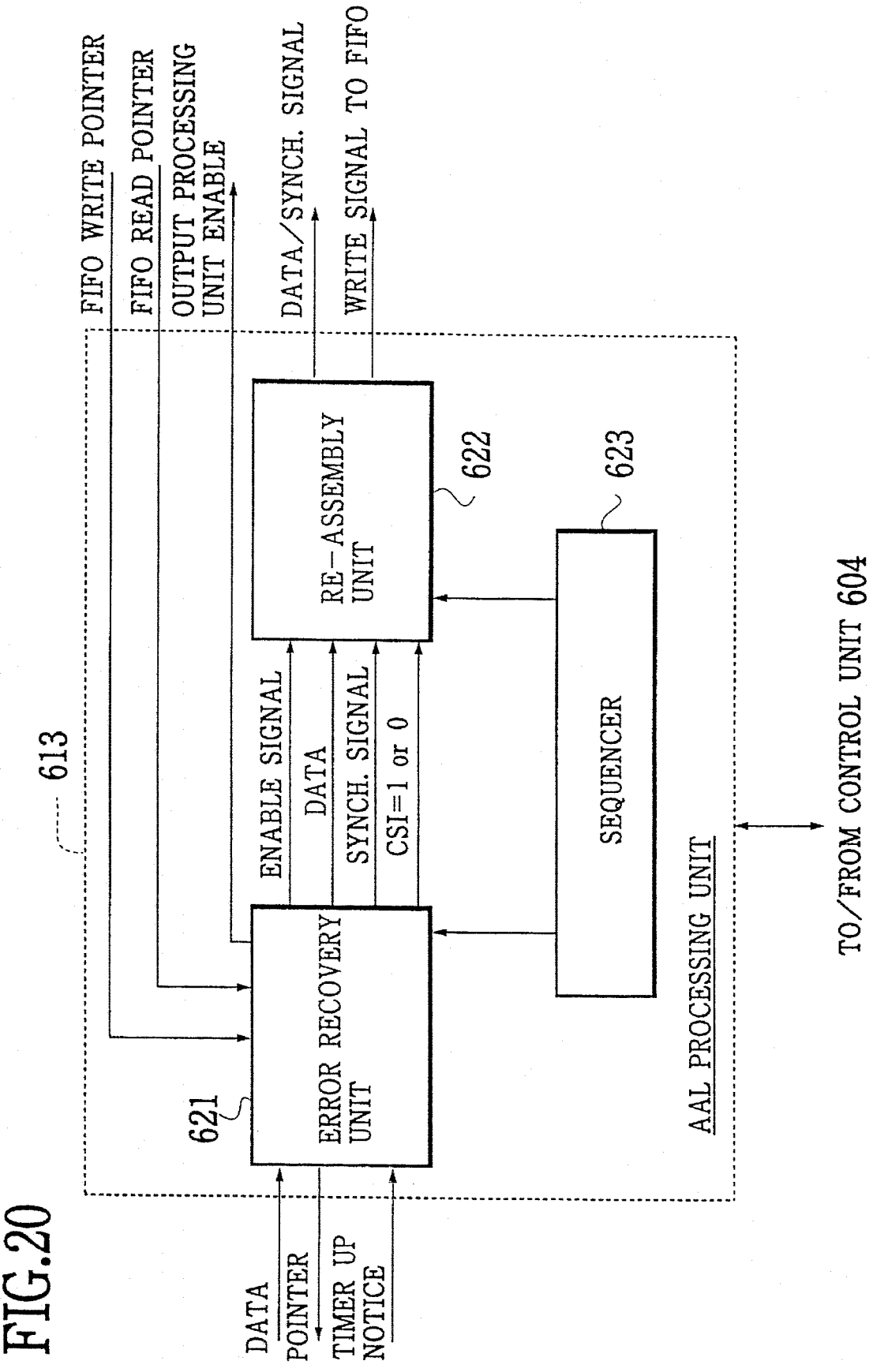
FIG. 20 is a diagram of an AAL processing unit in the ATM processing unit of FIG. 17.

The AAL processing unit 613 has a detailed configuration as shown in FIG. 20, which comprises an error recovery unit 621 connected with the jitter absorption buffer unit 612 and the buffer unit 602, a re-assembly unit 622 connected with the error recovery unit 621 and the buffer unit 602, and a sequencer 623 connected with the error recovery unit 621 and the re-assembly unit 622. This AAL processing unit 613 is sequentially operated in the ATM cell cycle by the sequencer 623, where the ATM cell cycle is actually a 53 clock cycle as the internal circuits are operated in the 8 bit parallel mode and the sequencer 623 activates the error recovery unit 621 and the re-assembly unit 622. Note that this 53 clock cycle coincides with the arrival cycle of the normal cells (i.e., the cells with correct cell length).

Figure 21:
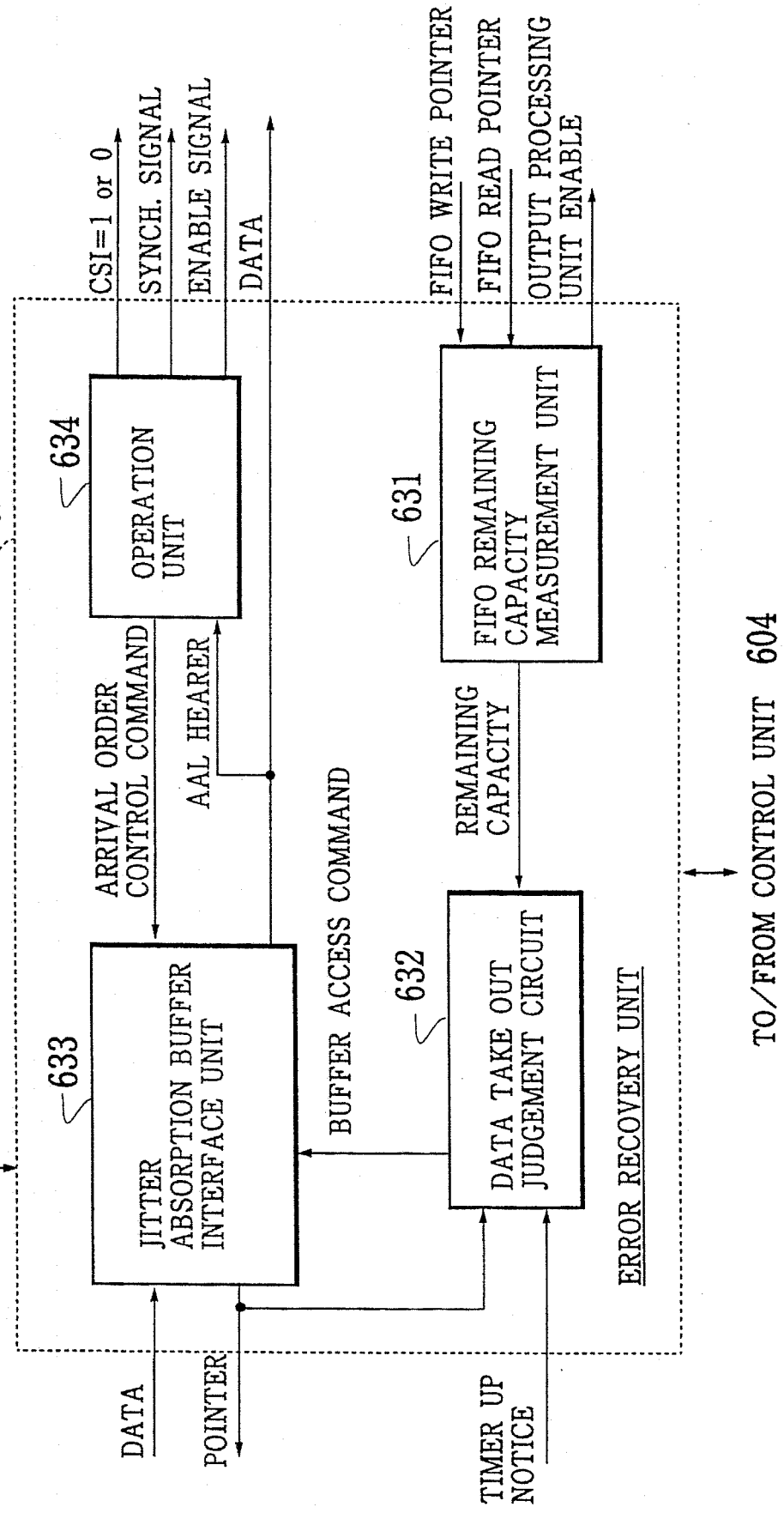
FIG. 21 is a diagram of an error recovery unit in the AAL processing unit of FIG. 20.

The error recovery unit 621 has a further detailed configuration as shown in FIG. 21, which comprises a jitter absorption interface unit 633 connected with the jitter absorption buffer unit 612, an AAL operation unit 634 connected with the jitter absorption buffer interface unit 633 and the re-assembly unit 622, a FIFO remaining capacity measurement unit 631 connected with the buffer unit 602, and a data take out judgement circuit 632 connected with the jitter absorption timer 614, the FIFO remaining capacity measurement unit 631, and the jitter absorption buffer interface unit 633.

The FIFO remaining capacity measurement unit 631 measures the currently remaining capacity of the FIFO (buffer unit 602) in terms of the number of words in real-time, and outputs the measurement result to the data take out judgement circuit 632. In addition, the FIFO remaining capacity measurement unit 631 outputs an output processing unit enable signal as an operation permission signal to the output processing unit 603 whenever the measured remaining capacity of the FIFO becomes less than or equal to a predetermined threshold value. This threshold value can be specified by the control unit 604 at a time of the call set up, or specified in advance as a fixed value.

The data take out judgement circuit 632 makes a judgement regarding whether or not to take out the data stored in the jitter absorption buffer unit 612 in the current sequencer cycle according to the currently remaining capacity of the buffer unit 602 measured by the FIFO remaining capacity measurement unit 631, a timer up notice supplied from the jitter absorption timer 614, and the stored data amount in the jitter absorption buffer unit 612 measured by a measurement circuit provided therein. The algorithm for making this judgement of the data take out will be described in detail below.

The jitter absorption buffer interface unit 633 is an interface between the AAL processing unit 613 and the jitter absorption buffer unit 612, which takes out the adaptation layer header from the jitter absorption buffer unit 612 and supplies it to the AAL operation unit 634 in accordance with the buffer access command from the data take out judgement circuit 632, and takes out the data following this adaptation layer header from the jitter absorption buffer unit 612 in accordance with an arrival order control command from the AAL operation unit 634.

Figure 22:
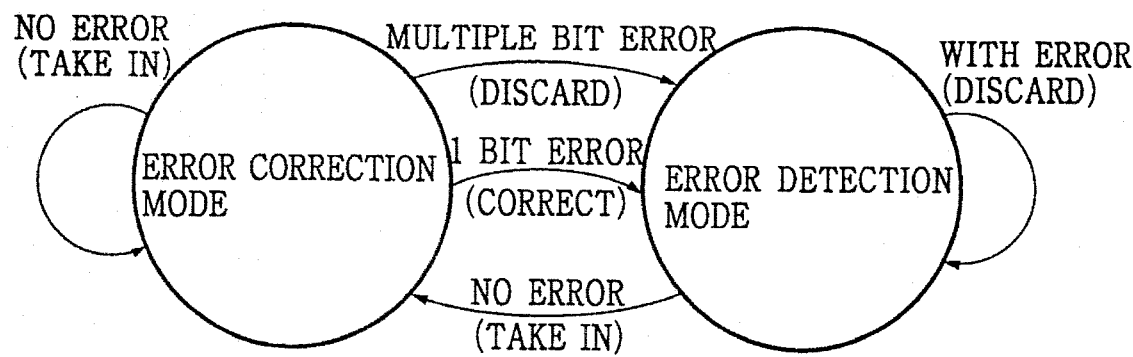
FIG. 22 is a diagrammatic illustration of a state machine for an AAL operation unit in the error recovery unit of FIG. 21.

The AAL operation unit 634 receives the adaptation layer header from the jitter absorption buffer interface unit 633, and carries out the error correction/detection operation on this adaptation layer header according to the state transition shown in FIG. 22. Then, the AAL operation unit 634 determines whether the data are to be taken out from the jitter absorption buffer unit 612 according to the current state in the state machine of FIG. 22, and issues the arrival order control command to the jitter absorption buffer interface unit 633 accordingly. Here, the error correction/detection operation is realized by sequentially carrying out the SNP calculation and the parity bit calculation by using the same SNP/parity calculation circuit configuration shown in FIG. 23 which will be described in detail below. As already mentioned above, this circuit of FIG. 23 may also be shared with the filter unit 611 as the SNP/parity calculation circuit required in the filter unit 611 described above in calculating the adaptation layer header at the start of its operation.

Figure 23:
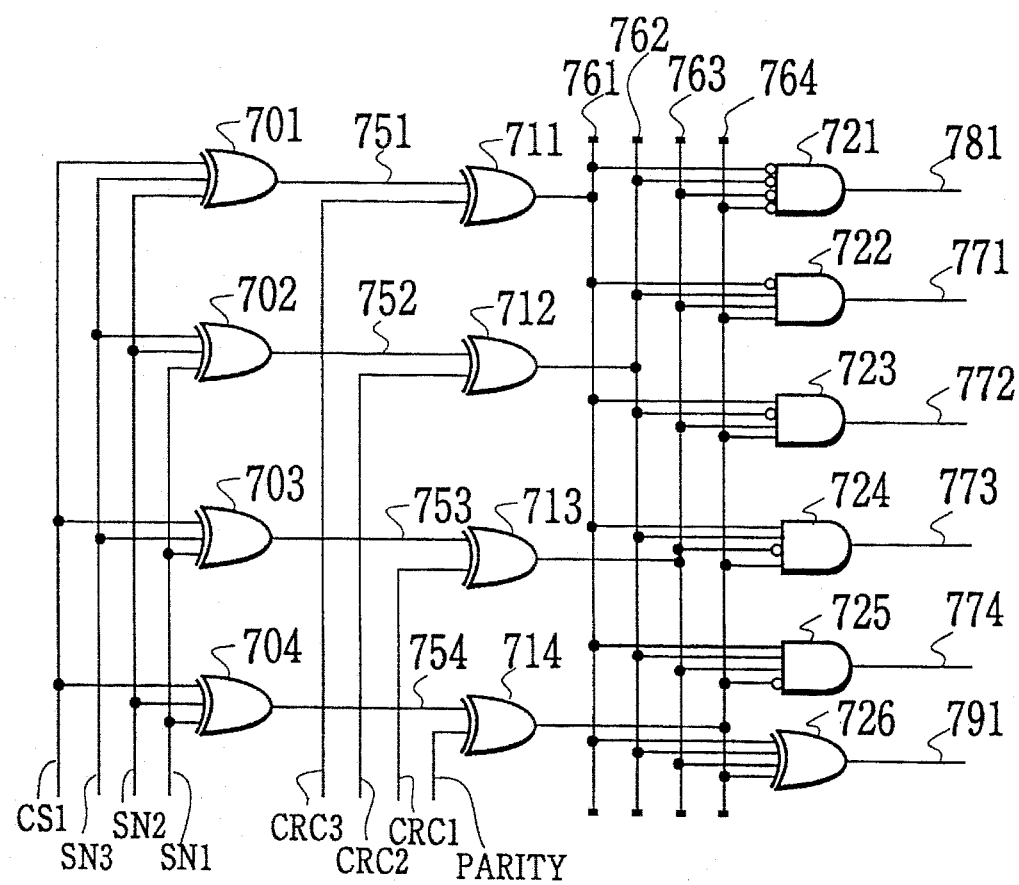
FIG. 23 is a circuit diagram of an SNP/parity calculation circuit to be provided in the AAL operation unit in the error recovery unit of FIG. 21.

Then, the AAL operation unit 634 compares the adaptation layer header obtained from the results of the above described calculations by the circuit of FIG. 23 with the received adaptation layer header, and selects the current state (mode) in the state machine of FIG. 22 as the error correction mode when the result of the comparison indicates that these are equal, and as the error detection mode otherwise. Then, the AAL operation unit 634 notifies the selected current state (mode) to the control unit 604, and carries out the cell arrival order control by looking up the sequence number according to the correct adaptation layer header with any necessary error correction applied only when there is no error while the current state (mode) is the error correction mode, or when there is only a 1 bit error while the current state (mode) is the error correction mode, or else when there is no error while the current state (mode) is the error detection mode.

Now, the SNP/parity circuit of FIG. 23 will be described in detail.

In this circuit of FIG. 23, the CSI bit and the sequence numbers SN3, SN2, and SN1 indicated in the adaptation layer header in a format shown in FIG. 24A for a 1 byte (adaptation layer (AAL) header or in a format shown in FIG. 24B for a 2 byte adaptation layer (AAL) header, are inputted into EXOR circuits 701 to 704 on the first step, respectively, so as to obtain CRC3, CRC2, CRC1 of the SNP and the parity as output signals 751 to 754, respectively.

Then, EXOR circuits 711 to 714 on the second step compare these calculated SNP and parity with the actual SNP and parity indicated in the received adaptation layer header, so as to obtain the output signals 761 to 764, each of which is in the H level when the respective one of the CRC3, CRC2, CRC1, and parity is in error.

Then, AND circuits 722 to 725 on the third step obtains output signals 771 to 774, which indicate the need for correction on SN1, CSI, SN2, and SN3, respectively. Here, however, these output signals 771 to 774 are taken to be meaningful only when there is no error or only 1 bit error in the adaptation layer header according to the state transition of FIG. 22, so that the circuit is also provided with AND circuit 721 to obtain an output signal 781 which is in the H level when there is no error and AND circuit 726 to obtain an output signal 791 which is in the H level when there is only a 1 bit error.

Thus, according to this SNP/parity calculation circuit of FIG. 23, when 781=L, 791=H, 771=L, 772=L, 773=H, and 774=L, it can be judged that the correction for SN2 is needed, for example.

It is to be noted that there is also a possibility for the transmission error to occur for the SNP/parity bits, but only the CSI and SN bits are utilized hereafter and the SNP/parity bits are not going to be used hereafter, so that there is no need to account for such a transmission error.

Also, the arrival order control in the AAL operation unit 634 mentioned above is carried out by using the window control scheme. Namely, as shown in FIG. 25, the judgement as to whether each arriving cell corresponds to a case of normal arrival, a case of cell loss, or a case of cell misinsertion is made according to an expectation value TN for the sequence number of the cell expected to arrive next, the sequence number SN of the actually arrived cell, and a window value W, under the conditions summarized in FIG. 25, and the appropriate processing for each case indicated in FIG. 25 is carried out.

In case it is judged as a case of the normal arrival, this fact is notified to the jitter absorption buffer interface unit 633 as the arrival order control command, such that the jitter absorption buffer interface unit 633 takes out the corresponding data from the the jitter absorption buffer 612, and outputs them to the re-assembly unit 622. Also, when this data take out operation is finished, the jitter absorption buffer interface unit 633 increments the cell pointer, so as to get ready for the next data take out.

In case it is judged as a case of the cell misinsertion, this fact is notified to the jitter absorption buffer interface unit 633 as the arrival order control command. In this case, the jitter absorption buffer interface unit 633 either does not take out the data from the jitter absorption buffer 612 or does not output the taken out data to the re-assembly unit 622, so as to discard this cell. The discarding of the cell is effectuated by incrementing the cell pointer at the end of the current sequencer cycle.

In case it is judged as a case of the cell loss, this fact is notified to the jitter absorption buffer interface unit 633 as the arrival order control command. In this case, the jitter absorption buffer interface unit 633 leaves the data of this cell in the jitter absorption buffer 612 in order to be able to take them out in the next sequencer cycle, by not incrementing the cell pointer at the end of the current sequencer cycle, and outputs the dummy data to the re-assembly unit 622, while ignoring the state transition of FIG. 22.

Namely, if the state transition according to the state transition diagram of FIG. 22 is made in this case of the cell loss, more than one state transitions can occur for the same adaptation layer header, which causes the following erroneous state transition. For example, when the adaptation layer header with 1 bit error which is associated with the sequence number to be judged as a case of the cell loss is received in the error correction mode, the state transition to the error detection mode takes place at a time of the first data take out, but the data are returned to the jitter absorption buffer 612. Then, at a time of the next data take out, even though it is the same adaptation layer header. It is judged that the adaptation layer header with 1 bit error is received in the error detection mode such that this cell will be erroneously discarded. In order to prevent this erroneous state transition, the state transition of FIG. 22 is ignored in a case of the cell loss.

In addition, when it is judged as a case of the cell misinsertion or a case of the cell loss, this fact is also notified to the control unit 604, and the control unit 604 counts a number of occurrences of these cases, for the purpose of inspection to be made externally.

In case the error recovery unit 621 outputs the valid data to the re-assembly unit 622 in the current sequencer cycle, the error recovery unit 621 outputs the enable signal for commanding the re-assembly unit 622 to carry out the re-assembly processing. At the same time, when the CSI bit in the adaptation layer header of the cell processed in the current sequencer cycle is in the ON state, it is also necessary to notify the position of the border between the CS-PDUs to the later stage. To this end, the error recovery unit 621 looks up the pointer indicated by the second byte of the adaptation layer header for this cell stored in the jitter absorption buffer unit 612, and notifies the synchronization signal to the re-assembly unit 622 in parallel to the data specified by this pointer when this data is outputted to the re-assembly unit 622. Here, the cycle for the error recovery unit 621 to notify the synchronization signal to the re-assembly unit 622 can be the same as the next sequencer cycle in which the enable signal is asserted in a case the pointer is pointing to the next cell.

The re-assembly unit 622 is operated only when the enable signal is received from the error recovery unit 621. In such a case, the re-assembly unit 622 receives the data from the error recovery unit 621 and carried out the algorithm of FIG. 27 to be described in detail below, so as to output the data to be given to the output processing unit 603 and the information concerning the synchronization between the ATM processing unit 601 and the output processing unit 603, i.e., the information concerning the head of the CS-PDU, to the buffer unit 602.

The sequencer 623 has a function of activating the error recovery unit 621 and the re-assembly unit 622, and is operating in the cell cycle, i.e., 53 clock cycle, as already mentioned above. This sequencer 623 is always operating in the 53 clock cycle, unlike the sequencer within the filter unit 611, and continues to be in the operation without being reset, even when the cell with abnormal cell length is entered into the ATM processing unit 601 and the sequencer within the filter unit 611 is reset. Thus, this sequencer 623 and the sequencer within the filter unit 611 are synchronized at a beginning of the operation, but they may not necessarily remain synchronized with each other during the operation.

The jitter absorption timer 614 starts its operation in response to a notice from the filter unit 611 which is triggered by the reception of the first cell with the CSI bit in the ON state among the cells having the specific cell header pattern. Then, after a predetermined number (referred hereafter as a jitter absorption cell number) of cells with the prescribed cell header pattern are received, or after an elapse of a predetermined time period (referred hereafter as a jitter absorption time period), the jitter absorption timer 614 outputs the timer up notice to the data take out judgement circuit 632 in the error recovery unit 621. Here, the jitter absorption cell number or the jitter absorption time period can be specified externally through the control unit 604, or specified in advance in an internal RAM.

The buffer unit 602 is a FIFO formed by a dual port RAM, which has a capacity for storing the data of two to three cells. The data from the ATM processing unit 601 are entered into this buffer unit 602 at the ATM side clock, and outputted to the output processing unit 603 at the STM side clock. The format of the data stored in this buffer unit 602 is substantially the same as that shown in FIG. 7 for the second embodiment of the ATM cell assembly device described above, in which the data and the frame synchronization information are stored in parallel. In this embodiment, the frame synchronization information indicates the value of the CSI bit of each cell.

Figure 26:
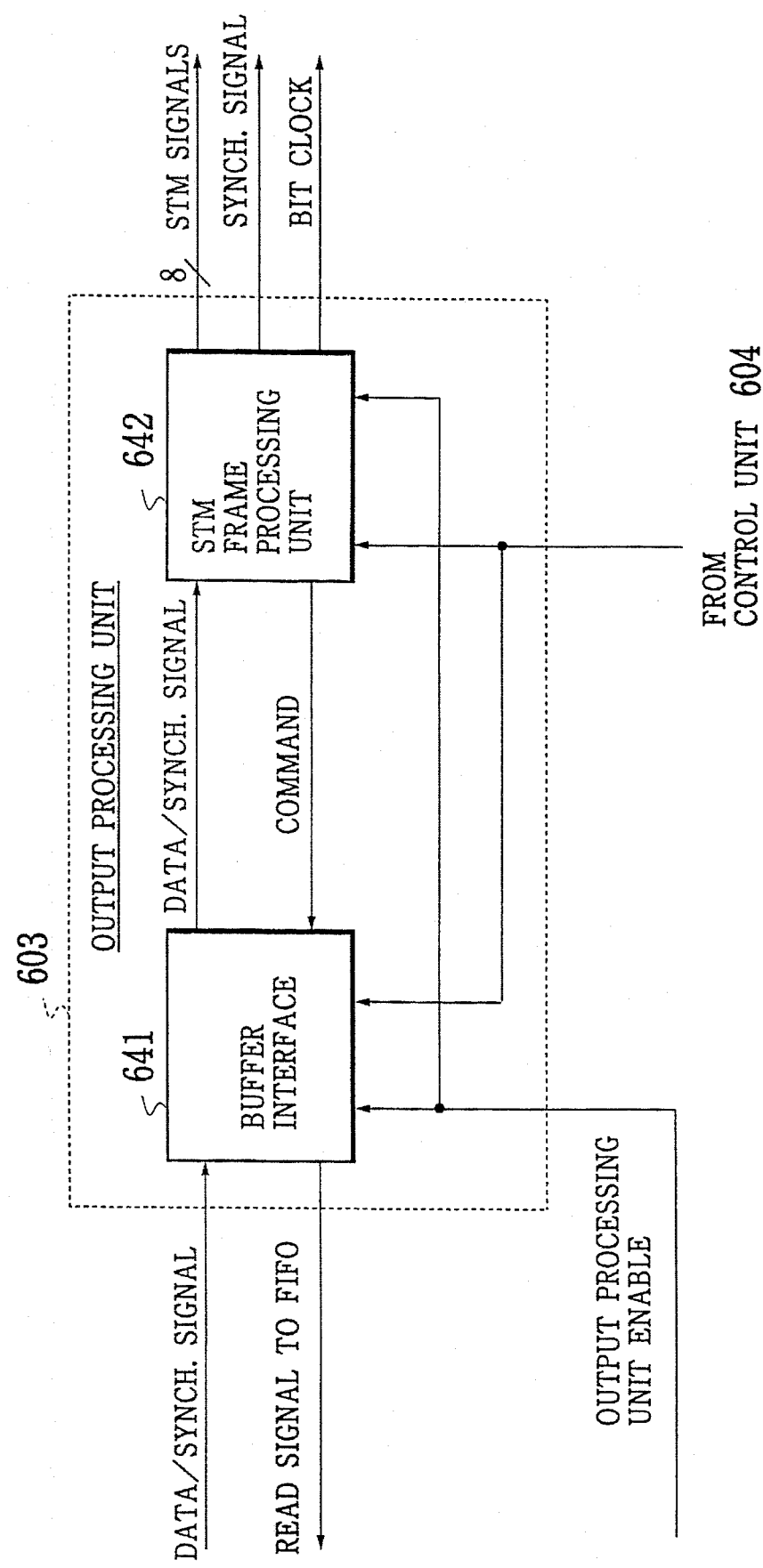
FIG. 26 is a diagram of an output processing unit in the ATM cell disassembly device of FIG. 16.

The output processing unit 603 has a detailed configuration as shown in FIG. 26, which comprises a buffer interface 641 connected with the buffer unit 602, and an STM frame processing unit 642 connected with the buffer interface 641.

The buffer interface 641 receives the data and the frame synchronization information from the buffer unit 602 and outputs them to the STM frame processing unit 642 in response to the command from the STM frame processing unit 642.

The STM frame processing unit 642 outputs the STM signals formed by the 8 bit parallel data to the external, for example. The STM signals to be outputted can be those in which each frame is divided into 32 STM time slots, or those formed by the CBR signals having arbitrary speed.

In case the STM signals with each frame divided into 32 STM time slots are outputted from the STM frame processing unit 642, a frame synchronization signal indicating a head of each frame in also outputted along with the STM signals for each frame, just as indicated in the timing chart of FIG. 6 for the second embodiment of the ATM cell assembly device described above. On the other hand, in a case the STM signals formed by the CBR signals having arbitrary speed are outputted from the STM frame processing unit 642, there is no need to output this kind of the signal indicating a head of a frame. Here, just as in the second embodiment of the ATM cell assembly device described above, a case of the signals with each frame divided into 32 STM time slots will be referred as an STM frame mode, while a case of the CBR signals with arbitrary speed will be referred as a CBR mode, to distinguish these two cases. Either one of these modes can be selected freely in advance from the external as well as from the control unit 604.

The STM frame processing unit 642 is operated at the STM frame cycle by the sequencer of 32 clock cycle provided therein, for example.

In the STM frame mode, the STM frame processing unit 642 loads the data received from the buffer interface 641 at frame positions specified from the control unit 604 in advance, and outputs them along with the frame synchronization signals to the external. In this STM frame processing unit 642, the synchronization of the sequencer provided therein with the ATM processing unit 601 is made according to the CSI bit information received from the buffer interface 641 and the frame head signal used therein in a manner described in detail below.

In the CBR mode, the STM frame processing unit 642 disregards the STM frames in the STM signals, and outputs all the data entered from the buffer interface 641 to the external. In addition, some kind of synchronization signal may also be outputted to the external.

In this output processing unit 603, the operation is started only after the output processing unit enable signal is received from the ATM processing unit 601. Before this output processing unit enable signal is received, the output processing unit 603 continually outputs the insignificant signals such as constant level signals. At this point, the operation of the sequencer provided therein may have already been started such that the output of the synchronization signal may be started.

The control unit 604 has various information specified either externally, or in internal ROM in advance, including the specific cell header pattern to be specified to the filter unit 611, the jitter absorption number or jitter absorption time period to be specified to the jitter absorption timer 614, the threshold for the remaining capacity of the FIFO for judging a timing for asserting the output processing unit enable signal to be specified to the FIFO remaining capacity measurement unit 631, the frame positions to be specified to the STM frame processing unit 642, etc., and provides these information to the ATM processing unit 601 and the output processing unit 603 while controlling their operations.

Now, the ATM cell disassembling operation in the ATM cell disassembly device of this embodiment will be described in detail.

The ATM processing unit 601 receives the input ATM cell flow in the 8 bit parallel mode. Then, the filter unit 611 extracts those cells among the entered ATM cells which have the specific cell header pattern, and stores them into the jitter absorption buffer unit 612. Here, the storing into the jitter absorption buffer unit 612 starts from the cell which has the specific cell header pattern, whose adaptation layer header is judged to have a normal value, and the CSI bit in that adaptation layer header is in the ON state. This measure is taken in order to initiate the operations at the later modules in the synchronized state. Also, the start of the storing into the jitter absorption buffer unit 612 is notified to the jitter absorption timer 614, such that the jitter absorption timer 614 starts counting the jitter absorption number or the jitter absorption time period.

Then, the filter unit 611 removes the 5 bytes ATM cell header from each of the extracted ATM cells as shown in FIG. 18, and stores the remaining 48 bytes data containing an adaptation layer header and a payload to the jitter absorption buffer unit 612 in a format shown in FIG. 19. These operations are activated by the sequencer of the cell cycle provided therein, which is activated by the externally entered cell head signal as a trigger.

When the number of cells stored in the jitter absorption buffer unit 612 reaches to the jitter absorption cell number or when the jitter absorption time period has elapsed, the jitter absorption timer 614 notifies the timer up notice to the AAL processing unit 613. Here, the AAL processing unit 613 is made to be unable to take out the data from the jitter absorption buffer unit 612 until this timer up notice is received from the jitter absorption timer 614.

Also, the AAL processing unit 613 is activated by the sequencer 623 of the ATM cell cycle, which is different from the sequencer provided within the filter unit 611 and operating the error recovery unit 621 and the re-assembly unit 622 of the AAL processing unit 613 synchronously at the ATM cell cycle. Since the sequencer provided within the filter unit 611 is reset by the externally entered cell head signal, the sequencer 623 of the AAL processing unit 613 and the sequencer within the filter unit 611 may not necessarily be operating in the identical phase.

The AAL processing unit 613 is activated by the sequencer 623 to carry out the following sequential operations at the cell cycle.

First, the data of the cells are taken out from the jitter absorption buffer unit 612 when the following three conditions are satisfied simultaneously:

(a) The data take out judgement circuit 632 in the error recovery unit 621 confirms the presence of the data accumulated in the jitter absorption buffer unit 612, i.e., that the difference between the values of the write pointer and the read pointer for the jitter absorption buffer unit 612 is more than 2;

(b) The data take out judgement circuit 632 confirms the availability of the currently remaining capacity of the buffer unit 602 capable of storing the the amount of data expected to be stored for the next cell (which is normally equal to 46 bytes when CSI=1, 47 bytes when CSI=0, and CS-PDU length=lcs when the partial filling is used, but it can also be fixed to a specific value such as 47 bytes) according to the currently remaining capacity of the buffer unit 602 measured by the FIFO remaining capacity measurement unit 631; and (c) The timer up notice permitting the start of the operation at the AAL processing unit 613 is received from the jitter absorption timer 614 at the data take out judgement circuit 632.

Here, the confirmation of the condition (a) is made because the filter unit 611 writes all the received cells regardless of whether they are the significant cells or the insignificant cells, and leaves only the significant cells in the jitter absorption buffer unit 612 by overwriting the insignificant cells, so that when the difference between the values of the write pointer and the read pointer for the jitter absorption buffer unit 612 is 1, there is a possibility that the currently written data are the insignificant data, and the condition (a) prevents the erroneous read out of the insignificant data from the jitter absorption buffer unit 612 in such a case.

The data take out judgement circuit 632 makes the judgement regarding these three conditions (a), (b), (c) at each cell cycle. In a case any one of these three conditions is not satisfied, the AAL processing unit 613 is in an idling state in which no data is taken out from the jitter absorption buffer unit 612, its internal state is not changed, and the data storing operation with respect to the buffer unit 602 is not carried out.

On the other hand, in a case all of these three conditions are satisfied, the data take out judgement circuit 632 supplies the buffer access command to the jitter absorption buffer interface unit 633, in response to which the jitter absorption buffer interface unit 633 takes out the data from the jitter absorption buffer unit 612. Here, the jitter absorption buffer interface unit 633 takes out the adaptation layer header from the jitter absorption buffer unit 612 first, and supplies it to the AAL operation unit 634.

The AAL operation unit 634 which receives the adaptation layer header carries out the error correction/detection operation on this adaptation layer header by using the SNP/parity calculation circuit of FIG. 23, and makes the state transition according to the state machine of FIG. 22 according to the result of the calculation by the SNP/parity calculation circuit of FIG. 23. In addition, when there is no error or only 1 bit error in the error correction mode or when there is no error in the error detection mode, the AAL operation unit 634 carries out the cell arrival order control to judge the cases of normal arrival, cell misinsertion, and cell loss, by looking up the sequence number in the adaptation layer header after the correction, as described in detail above. Then, whenever appropriate, the AAL operation unit 634 commands the jitter absorption buffer interface unit 633 to supply the remaining data to the re-assembly unit 622, and asserts the enable signal for the re-assembly unit 622 as described above.

Otherwise, the cell is discarded by incrementing the read pointer for the jitter absorption buffer unit 612 at the end of the current sequencer cycle, and the AAL processing unit 613 remains in the idling state throughout the current sequencer cycle.

Here, when the first cell is received at the error recovery unit 621, the expectation value TN of the sequence number is not yet determined, so that the window control is not applied to the first received cell, and the expectation value TN of the sequence number for the next cell is obtained by incrementing the sequence number of the first received cell.

The re-assembly unit 622 which received the data from the error recovery unit 621 extracts the data to be transmitted to the output processing unit 603 among the received data, and stores them into the buffer unit 602. At this point, the extraction of the necessary data is achieved according to the flow chart of FIG. 27, and the re-assembly unit 622 also transmits the information on the border between the CS-PDUs, i.e., the information concerning the CSI bit, as the synchronization information between the ATM processing unit 601 side and the output processing unit 603 side, to the buffer unit 602 along with the data. More specifically, when the error recovery unit 621 received the cell with the CSI bit in the ON state, the border between the CS-PDUs is detected by looking up the pointer value in the adaptation layer header of that cell, and the position of the detected border is transmitted as the synchronization information to the re-assembly unit 622 in parallel to the data. Then, the re-assembly unit 622 stores the synchronization information in correspondence to the data in the buffer unit 602 in a format shown in FIG. 7.

Figure 27:
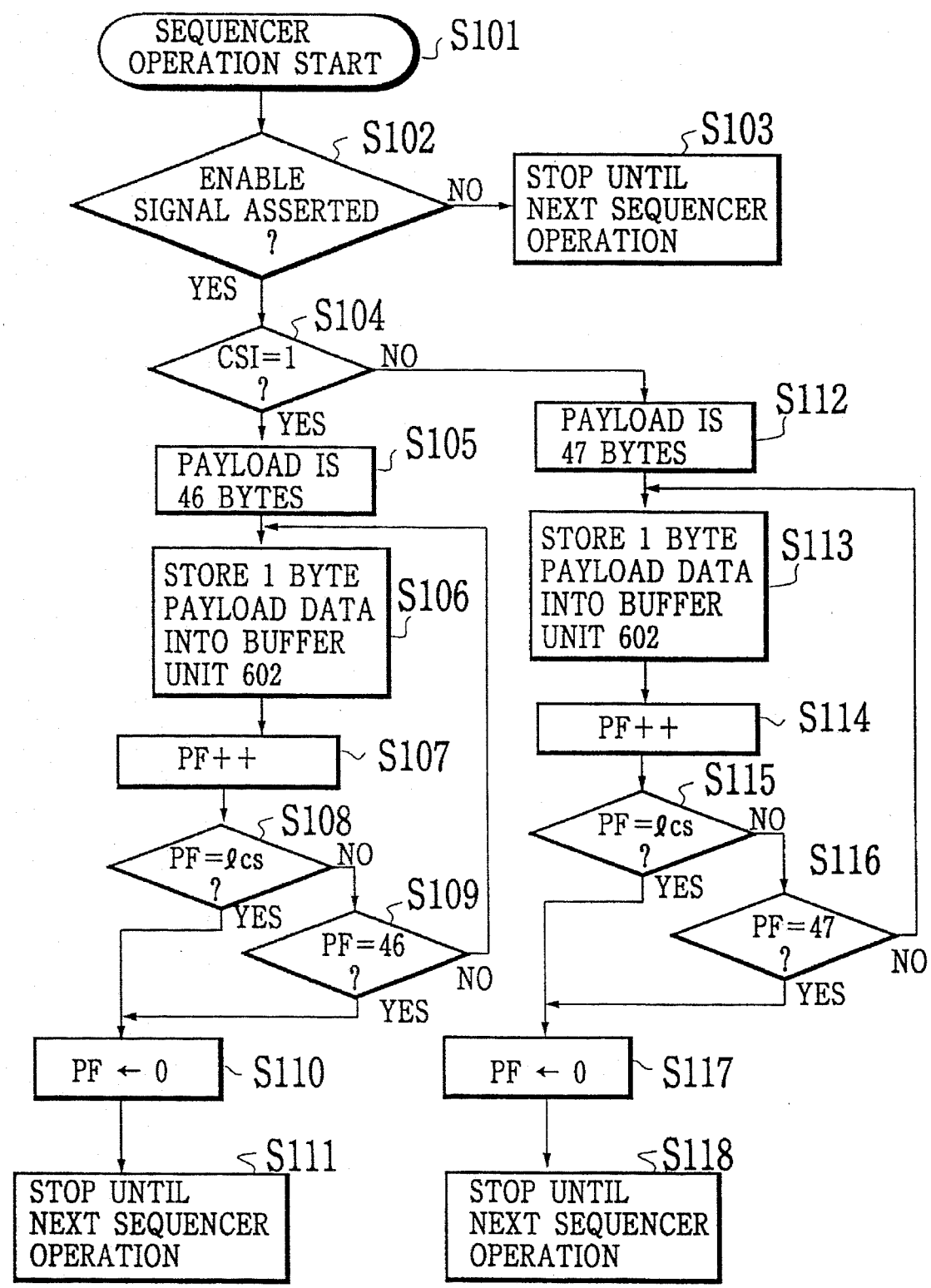
FIG. 27 is a flow chart for the algorithm to be executed by a re-assembly unit in the AAL processing unit of FIG. 20.

Now, the algorithm of FIG. 27 to be executed by the re-assembly unit 622 will be described in detail.

As already mentioned above, this re-assembly unit 622 is also operated by the sequencer 623 which also operates the error recovery unit 621, at the cell cycle equal to the 53 clock cycle. Here, it is assumed that the error recovery unit 621 spends first 7 clocks (corresponding to the header length) of this sequencer cycle for the analysis of the adaptation layer header for example. In this case, after the sequencer operation starts at the step S101, next at the step S102, the re-assembly unit 622 checks whether the enable signal from the error recovery unit 621 is asserted or not at the 8-th clock of the sequencer cycle.

In case the enable signal is not asserted, it implies that no data is going to be transmitted from the error recovery unit 621 in this sequencer cycle, so that the operation of the re-assembly unit 622 is stopped until the next sequencer cycle at the step S103, such that the storing of the data in to the buffer unit 602 is not made in this sequencer cycle.

On the other hand, in a case the enable signal is asserted, it implies that the data are going to be transmitted from the error recovery unit 621 in this sequencer cycle. In this case, next at the step S104, whether the CSI bit of the cell transmitted from the error recovery unit 621 is equal to 1 (ON state) or not is checked according to this information supplied from the error recovery unit 621 along the data, and the following operations are carried out.

In case CSI=1, it implies that the adaptation layer header is of 2 bytes size, so that it can be judged at the step S105 that the payload is of 46 bytes size. Consequently, unless the partial filling is used for this cell, the data to be transmitted to the output processing unit 603 are loaded in all of the 46 bytes of the payload. Thus, the payload data are stored into the buffer unit 602 one byte by one byte at the step S106, until the number of bytes of the stored payload data counted by a PF (Partial Filling) counter which is incremented one by one at the step S107 reaches to "46" at the step S109. In a case the partial filling is used for this cell, the payload data are stored into the buffer unit 602 one byte by one byte at the step S106, until the number of bytes of the stored payload data counted by the PF counter which is incremented one by one at the step S107 reaches to the partial filling number lcs (=CS-PDU length) specified in advance at the step S108. Then, at the end of the current sequencer cycle, the PF counter is reset to 0 at the step S110, and the operation is stopped until the next sequencer cycle at the step S111.

Similarly, in case CSI=0, it implies that the adaptation layer header is of 1 byte size, so that it can be judged at the step S112 that the payload is of 47 bytes size. Consequently, unless the partial filling is used for this cell, the data to be transmitted to the output processing unit 603 are loaded in all of the 47 bytes of the payload. Thus, the payload data are stored into the buffer unit 602 one byte by one byte at the step S113, until the number of bytes of the stored payload data counted by the PF counter which is incremented one by one at the step S114 reaches to "47" at the step S116. In a case the partial filling is used for this cell, the payload data are stored into the buffer unit 602 one byte by one byte at the step S113, until the number of bytes of the stored payload data counted by the PF counter which is incremented one by one at the step S114 reaches to the partial filling number lcs (=CS-PDU length) specified in advance at the step S115. Then, at the end of the current sequencer cycle, the PF counter is reset to 0 at the step S117, and the operation is stopped until the next sequencer cycle at the step S118.

It is to be noted that whether or not to use the partial filling is specified in advance at a time of the call set up.

It is also possible to provide a circuit for making the synchronization between the CSI bit and the CS-PDU length (lcs) within the re-assembly unit 622. Here, this circuit should account for the fact that the CSI is not necessarily equal to 1 in every CS-PDU length.

Also, the storing of the data into the buffer unit 602 starts from the data transmitted from the error recovery unit 621 along with the synchronization information, and the data preceding such a data are not stored into the buffer unit 602.

After the start of the storing of the first data received from the error recovery unit 621 into the buffer unit 602, the re-assembly unit 622 looks up the measurement result of the FIFO remaining capacity measurement unit 631, and when the measurement result becomes smaller than the threshold specified in advance from the control unit 604, the re-assembly unit 622 outputs the output processing unit enable signal as an operation start trigger to the output processing unit 603.

Here, the threshold may be specified by the hardware rather than from the control unit 604. Also, the measurement circuit similar to the FIFO remaining capacity measurement unit 631 may be contained within the re-assembly unit 622 such that the output processing unit enable signal can be asserted by the re-assembly unit 622 by itself, without referring to the error recovery unit 621, or the measurement circuit similar to the FIFO remaining capacity measurement unit 631 may be provided on the output processing unit 603 side.

Also, at the data take out judgement circuit 632, when the underflow of the jitter absorption buffer unit 612 is detected, it is not necessary to treat it as an error, but when the overflow of the jitter absorption buffer unit 612 is detected, it is necessary to treat it as an error, in which case the occurrence of the error must be notified to the control unit 604 and the exceptional processing such as an initialization of the jitter absorption buffer unit 612 for example must be carried out.

The output processing unit 603 is activated by the sequencer of 32 clock cycle. This output processing unit 603 takes out the data from the buffer unit 602 only when the enable signal is received from the AAL processing unit 613, and outputs the STM signals. Until the enable signal is received from the AAL processing unit 613, the output processing unit 603 outputs the dummy data.

In a case of the STM frame mode, in accordance with the sequencer operation, the data of a prescribed frame length are taken out from the buffer unit 602, and loaded into a prescribed frame position to form the STM frame, and then outputted to the external. In this STM frame, to those time slots to which the data from the buffer unit 602 are not loaded, the dummy data (i.e., meaningless data such as all identical pattern) are loaded. Here, the dummy pattern may be specified externally through the control unit 604 whenever necessary. At this point, at an appropriate point in the sequencer cycle such as a point at which the value of the counter forming the sequencer becomes 0, the data and the frame synchronization signal are outputted in a form of FIG. 6. In this manner, the STM frame is formed by taking out a prescribed amount of data from the buffer unit 602 at a prescribed cycle.

In a case of the CBR mode, the output processing unit 603 disregards the STM frames in the STM signals, and takes out the data from the buffer unit 602 continuously and outputs all the data taken out from the buffer unit 602 to the external. In the output processing unit 603, this CBR mode can be considered as a case of the STM frame mode with the frame length equal to "32" effectively. In addition, some kind of synchronization signal may also be outputted the external.

Here, the output processing unit 603 receives the CSI bit from the ATM processing unit 601 through the buffer unit 602, which can be utilized in making the synchronization between the ATM processing unit 601 and the output processing unit 603. More specifically, it is assumed that, at a time of the ATM cell assembling, the data located at a head of the STM frame is set at a head of the CS-PDU, or the CS-PDU is formed at every head of several STM frames, and the head is set to be the data specified by "CSI bit+pointer", i.e., the data for which the synchronization information is also stored in the buffer unit 602 in correspondence to the data. When the ATM cell so formed is cell disassembled, the data transmitted from the ATM processing unit 601 in parallel to the synchronization information are always located at a head of the STM frame, so that the synchronization between the ATM processing unit 601 and the output processing unit 603 can be made by checking such data.

In order to establish the synchronization in the above described manner, there is a need to make an initial synchronization at a time of starting the cell disassembling. For this reason, when the output processing unit 603 receives the output processing unit enable signal from the ATM processing unit 601, the first data taken out from the buffer unit 602 at a beginning of the next sequencer cycle are loaded into the first time slot of the STM frame, or into a prescribed slot position for which the synchronization can be made. This is because the first cell to be loaded by the filter unit 611 into the jitter absorption buffer unit 612 is the cell with the CSI bit in the ON state, and this first cell is then transmitted through the error recovery unit 621 and the re-assembly unit 622 without any problem and going to be the first data stored into the buffer unit 602, so that it is possible to guarantee that the first byte of this first data is always the head data of the CS-PDU. Consequently, by loading this data into the head or the prescribed position in the STM frame, it becomes possible to establish the initial synchronization of the ATM processing unit 601 side and the output processing unit 603 side.

In a case of not making the synchronization using the CSI bit, either in the STM frame mode or the CBR mode, the operation concerning the CSI bit can be omitted. In this case, the filter unit 611 can store the first received cell with the specific cell header pattern into the jitter absorption buffer unit 612, and there is no need for the AAL processing unit 613 to carry out the storing of the synchronization information into the buffer unit 602. Whether or not to make the synchronization using the CSI bit can be specified either externally or through the control unit 604.

Here, in case the ATM processing unit 601 and the output processing unit 603 become asynchronous, such as when the data taken out from the buffer unit 602 as the head of the STM frame at the output processing unit 603 do not contain the synchronization information from the ATM processing unit 601 side, it can be regarded as a case of the synchronization error and the output processing unit 603 side carries out the exceptional processing. Namely, the output processing unit 603 notifies the control unit 604 about the occurrence of this synchronization error, and outputs the dummy data for the rest of this sequence. Then, In order to obtain the synchronized data for the next STM frame to be outputted, the data stored in the buffer unit 602 are sequentially read out for nothing until the data containing the synchronization information on the ATM processing unit 601 side can be taken out. When the data containing the synchronization information on the ATM processing unit 601 side is taken out, the reading from the buffer unit 602 is stopped, and the synchronized ATM cell disassembling is carried out in the next sequence.

It is to be noted that, even in a case of the CBR mode, the STM signals to be outputted may have a frame structure with a constant CS-PDU length. In such a case, the CS-PDU length is notified from the control unit 604, and the synchronization between the ATM processing unit 601 and the output processing unit 603 as described above is made at each cycle of the CS-PDU length.

Also, when the overflow or the underflow occurs at the buffer unit 602, the similar exceptional processing can be carried out while notifying the control unit 604. Here, the exceptional processing includes the continual output of the dummy data until the normal state of the buffer unit 602 is recovered.

It is to be noted that the ATM cell disassembly device of this embodiment described above can be modified variously, as follows.

(1) Instead of comparing the currently remaining capacity of the buffer unit 602 measured by the FIFO remaining capacity measurement unit 631 with the amount of data for the payload of the valid call to be stored into the buffer unit 602 next, the amount of data stored in the buffer unit 602 can be compared with a predetermined threshold can be compared, such that it can be judged that sufficient capacity is remaining in the buffer unit 602 whenever the stored data amount of the buffer unit 602 is less than the threshold, only in which case the data are stored into the buffer unit 602.

(2) In the data take out judgement circuit 632 in the error recovery unit 621, the comparison can be made more loosely. For example, the amount of data to be stored into the buffer unit 602 next can be compared with the FIFO remaining capacity measurement result+$\alpha$, where $\alpha$ represents a tolerable margin.

(3) The values of VPI, VCI, PT, and CLP fields to be received can be made variable or multiple depending on the position in the STM frame, such that a plurality of ATM connections can be set up and received at once.

(4) The ATM processing unit 601 can be operated in sequencer of an integer multiple of the cell cycle, or in the random logic of the cell cycle or its integer multiple, instead of the sequencer of the cell cycle as described above.

(5) The operation speed or the sequencer cycle for the AAL processing unit 613 in the ATM processing unit 601 may be faster or shorter that the input speed or the sequencer cycle of the filter unit 611.

(6) The above description has been given by using the STM/CBR data as the output data, but this embodiment is equally applicable to the VBR (Variable Bit Rate) data as well as to the burst data.

As described, according to the ATM cell disassembly device of this embodiment, when the STM frame mode is selected at the output processing unit 603 side, the data can be loaded into any desired time slot from the buffer unit 602 and then outputted to the external, so that the entered ATM cell flow can be put into the STM signals at the greater flexibility. In addition, the single configuration of FIG. 16 is applicable to the ATM cell disassembling of any data size from that of just one slot to that of any desired number of time slots.

Also, when the CBR mode is used, the STM side can have any desired speed, so that it becomes possible to realize a flexible speed-independent ATM cell disassembly device. Here, however, it should be obvious that the operation speed on the STM side cannot exceed the operation speed on the ATM side. To be specific, in the exemplary situation used in the above description, the upper bound for the operation speed on the STM side is set by the operation speed on the ATM side multiplied by 47/53, so that the operational frequency ratio for the STM and ATM sides can be set arbitrarily only within this limit in this embodiment.

Moreover, on the ATM processing unit 601 side, the data are temporarily stored in the jitter absorption buffer unit 612 in which only those cells having the specific cell header pattern among the received cells are stored, and then, according to the sequencer of the cell cycle, only when the remaining capacity of the buffer unit 602 is available, the data to be transmitted to the output processing unit 603 side are stored into the buffer unit 602. As a result, the flow control is applied to the buffer unit 602, and the operation speed on the ATM side is normally faster than the operation speed on the STM side, so that the buffer unit 602 is not going to store more than a certain amount of data and therefore the capacity of the buffer unit 602 can be relatively small, which contributes to the reduction of the amount of hardware.

Furthermore, the filter unit 611 starts the storing of the data into the jitter absorption buffer unit 612 from the cell with the CSI bit in the adaptation layer header in the ON state among those cells having the specific cell header pattern, so that the initial synchronization between the ATM processing unit 601 side and the output processing unit 603 side can be established easily.

Thus, in this ATM cell disassembly device, because at least a part of the device is operated in the same sequencer cycle as the cell arrival cycle and the data contained in the payload of the arrived cell to be cell disassembled are stored in the buffer unit 602 only when the remaining capacity of the buffer unit 602 is larger than or equal to the size of the data, the flow control can be applied to the buffer unit 602, such that the buffer overflow can be prevented.

Also, by setting the speed for storing the data by the aforementioned part of the device on the ATM processing unit 601 to be faster than the data take out speed of the output processing unit 603, the buffer unit 602 can be applied with the flow control between the ATM processing unit 601 and the output processing unit 603 such that more than a certain amount of data are always stored in the buffer unit 602, so that as the output processing unit 603 takes out a certain amount of data from this buffer unit 602 at a certain cycle, the data take out speed on the output processing unit 603 side can be set to any desired speed, within a limit that it does not exceed the speed for storing on the ATM processing unit 601 and a certain amount of data are to be taken out at a certain cycle. Thus, this ATM cell disassembly device can be independent of the data speed required on the output side.

Moreover, by forming the buffer unit 602 from a dual port RAM, it becomes possible to make the speed conversion (clock conversion) between the speed on the ATM processing unit 601 side and the speed on the output processing unit 603 side, so that the ATM cell flow can be cell disassembled into the STM signals with any desired speed.

In addition, as the ATM processing unit 601 is formed from the filter unit 611, the jitter absorption buffer unit 612, and the AAL processing unit 613, in which the filter unit 622 extracts only those cells which have the specific cell header pattern from the entered cell flow, a part of the extracted cells are stored in the jitter absorption buffer unit 623, and the cells stored in the jitter absorption buffer unit 612 are taken out and processed by the AAL processing unit 613 after an elapse of a predetermined time or a receiving of a predetermined number of cells, such that the cells loaded with the data needed on the output side alone can be extracted and transmitted to the buffer unit 602 and the output processing unit 603, while absorbing the jitter in the cell arrival cycle (cell delay variation) occurring in the ATM communication network side.

Moreover, this jitter absorption buffer unit 612 can pool the data temporarily when the storing into the buffer unit 602 cannot be carried out as a sufficient remaining capacity is not available in the buffer unit 602 during the flow control between the ATM processing unit 601 and the buffer unit 602, so as to prevent the loss of the data.

Also, at the AAL processing unit 613, the cell loss and cell misinsertion are detected and the data are stored into the buffer unit 602 only after the appropriate processing is applied to the data, so that it becomes possible to deal with the cell loss and cell mlsinsertion which are characteristic phenomena associated with the ATM communication network.

Furthermore, in the ATM communication, there are cases in which the CSI bit is provided in the adaptation layer header of the cell in order to make a synchronization between the CS-PDU and the ATM cell (or SAR-PDU) by using this CSI bit. In this ATM cell disassembly device, the filter unit 611 starts the storing of the data into the jitter absorption buffer unit 612 from the cell with the CSI bit in the adaptation layer header in the ON state among those cells having the specific cell header pattern, and the data are transmitted through the jitter absorption buffer unit 612, the AAL processing unit 613, the buffer unit 602, to the output processing unit 603, such that the output processing unit 603 can regard the first data received from the buffer unit 602 as the synchronized one, and therefore the initial synchronization between the ATM processing unit 601 side and the output processing unit 603 side can be established easily.

It is to be noted here that, besides those already mentioned, many modifications and variations of the above embodiments may be made without departing from the novel and advantageous features of the present invention. Accordingly, all such modifications and variations are intended to be included within the scope of the appended claims.

What is claimed is:

1. An asynchronous transfer mode (ATM) cell assembly device for obtaining an ATM cell flow by assembling ATM cells from input data, comprising:

buffer means for temporarily storing the input data, from which stored data are outputted when an amount of the stored data becomes not less than a prescribed data amount sufficient for loading a payload section of each ATM cell; and cell assembly means for assembling each ATM cell by loading the stored data outputted from the buffer means into the payload section and attaching a header section to the payload section, and then for outputting each assembled ATM cell when the stored data outputted from the buffer means are received and for outputting an empty cell when the stored data outputted from the buffer means are not received.

2. The device of claim 1, wherein the input data are entered in forms of synchronous transfer mode (STM) signals formed from a plurality of frames, where each frame is divided into a plurality of time slots, and the device further comprises data input means for extracting selected ones of the time slots in each frame of the STM signals as the input data and storing the extracted input data into the buffer means.

3. The device of claim 1, wherein the input data are entered in forms of synchronous transfer mode (STM) signals formed from continuous bit rate (CBR) signals with an arbitrary speed.

4. The device of claim 1, wherein the buffer means comprises a first-in first-out (FIFO) memory formed by a dual port RAM, to which the input data are stored at operation cycles of an input side from which the input data are entered, and from which the stored data are outputted at operation cycles of an output side to which the ATM cell flow is to be outputted.

5. The device of claim 1, wherein the cell assembly means includes means for generating the empty cells to be outputted when the stored data outputted from the buffer means are not received.

6. The device of claim 1, wherein the cell assembly means includes means for measuring the amount of the stored data in the buffer means at ATM cell output cycles, in accordance with which the cell assembly means acquires the stored data from the buffer means.

7. The device of claim 1, wherein the cell assembly means uses a partial filling scheme and includes dummy pattern output means for generating a dummy pattern to be filled into a remaining portion of a partially filled payload section in each ATM cell after the stored data are loaded.

8. An asynchronous transfer mode (ATM) cell assembly device for obtaining an ATM cell flow by assembling ATM cells from input data, comprising:

encoding means for obtaining the input data by encoding data to be transmitted as the ATM cells;

buffer means for temporarily storing the input data obtained by the encoding means;

output permission means for issuing an output permission signal permitting an output of the input data stored in the buffer means in accordance with usage parameter control (UPC) parameters determined at a time of call set up, where the buffer means is allowed to output the input data stored therein only when the output permission signal is received from the output permission means; and cell assembly means for assembling each ATM cell by loading the stored input data outputted from the buffer means into a payload section and attaching a header section to the payload section, and outputting the ATM cell flow containing the assembled ATM cells.

9. The device of claim 8, wherein the buffer means controls either one of an encoding speed of the encoding means by which the encoding means encodes the data and an input data output speed of the encoding means by which the encoding means outputs the input data, according to one of an amount of the input data currently stored therein and a buffer capacity currently remaining therein.

10. The device of claim 9, wherein the buffer means controls said one of the encoding speed and the input data output speed of the encoding means such that said one of the encoding speed and the input data output speed of the encoding means is decreased when the amount of the input data currently stored in the buffer means becomes greater than a predetermined threshold, or when the capacity currently remaining in the buffer means becomes less than another predetermined threshold, and said one of the encoding speed and the input data output speed of the encoding means is increased when the amount of the input data currently stored in the buffer means becomes less than said predetermined threshold, or when the capacity currently remaining in the buffer means becomes greater than said another predetermined threshold.

11. The device of claim 8, wherein the buffer means outputs insignificant data different from the input data to be transmitted as said assembled ATM cells when the output permission signal is received from the output permission means when a sufficient amount of the input data are not stored therein, and the cell assembly means outputs one of an empty cell, a signaling cell, and an OAM (Operation, Administration, and Maintenance) cell when the insignificant data are outputted from the buffer means.

12. An asynchronous transfer mode (ATM) cell disassembly device for obtaining output signals from entered ATM cell flow by disassembling ATM cells, comprising:

ATM processing means for extracting output data to be outputted as the output signals from the ATM cells;

buffer means for temporarily storing the output data extracted by the ATM processing means, the output data being supplied from the ATM processing means to the buffer means and stored in the buffer means when a capacity of the buffer means currently remaining becomes not less than an amount of data loaded in a payload section of each ATM cell; and output processing means for obtaining the output signals from the output data outputted from the buffer means, and outputting the obtained output signals.

13. The device of claim 12, wherein the ATM processing means further comprises:

filter unit for extracting selected ATM cells which have a specific cell header pattern among the ATM cells of the entered ATM cell flow;

jitter absorption buffer unit for temporarily storing at least a part of the selected ATM cells extracted by the filter unit; and AAL processing unit for extracting the output data from said at least a part of the selected ATM cells stored in the jitter absorption buffer unit and outputting the extracted output data to the buffer means.

14. The device of claim 13, wherein the storing of said at least a part of the selected ATM cells from the filter unit into the jitter absorption buffer unit starts from one of the selected ATM cells whose adaptation layer header has a synchronization bit in an ON state.

15. The device of claim 13, wherein said at least a part of the selected ATM cells are taken out from the jitter absorption buffer unit by the AAL processing unit after an elapse of a prescribed time period since a start of the storing of said at least a part of the selected ATM cells or after a prescribed number of said at least a part of the selected ATM cells are stored from the filter unit to the jitter absorption buffer unit, so as to absorb jitters in cell arrival cycles of the ATM cells.

16. The device of claim 13, wherein the AAL processing unit includes means for measuring the capacity currently remaining in the buffer means at cell arrival cycles of the ATM cells.

17. The device of claim 13, wherein the AAL processing unit includes error recovery means for detecting and correcting cell loss and cell misinsertion errors in the entered ATM cell flow.

18. The device of claim 12, wherein the output signals are synchronous transfer mode (STM) signals formed from a plurality of frames, where each frame is divided into a plurality of time slots, and the output processing means obtains the output signals by loading the output data into the time slots in each frame of the STM signals.

19. The device of claim 12, wherein the STM signals are formed from continuous bit rate (CBR) signals with an arbitrary speed.

20. The device of claim 12, wherein the buffer means comprises a first-in first-out (FIFO) memory formed by a dual port RAM, to which the input data are stored at operation cycles of an input side from which the ATM cell flow is entered, and from which the stored data are outputted at operation cycles of an output side to which the output signals are to be outputted.

* * * * *